US012755352B2

(12) United States Patent
Imber et al.

(10) Patent No.: US 12,755,352 B2
(45) Date of Patent: Oct. 6, 2026

(54) ADAPTIVE SHARPENING FOR BLOCKS OF UPSAMPLED PIXELS

(71) Applicant: Imagination Technologies Limited, Kings Langley (GB)

(72) Inventors: James Imber, Hertfordshire (GB); Joseph Heyward, Hertfordshire (GB); Kristof Beets, Hertfordshire (GB); John Viljoen, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 268 days.

(21) Appl. No.: 18/478,050

(22) Filed: Sep. 29, 2023

(65) Prior Publication Data

US 2024/0161253 A1 May 16, 2024

(30) Foreign Application Priority Data

Sep. 30, 2022 (GB) ..................................... 2214438

(51) Int. Cl.

| | |
|---|---|
| ***G06T 5/73*** | (2024.01) |
| ***G06T 3/4007*** | (2024.01) |
| ***G06T 3/4053*** | (2024.01) |
| ***G06T 5/75*** | (2024.01) |

(52) U.S. Cl.

CPC .............. *G06T 5/73* (2024.01); *G06T 3/4007* (2013.01); *G06T 3/4053* (2013.01); *G06T 2207/20212* (2013.01)

(58) Field of Classification Search

CPC .... G06T 5/73; G06T 5/75; G06T 3/40; G06T 2207/20

See application file for complete search history.

(56) References Cited

U.S. PATENT DOCUMENTS

| | | | | |
|---|---|---|---|---|
| 9,165,349 | B2 | 10/2015 | Kwon et al. | |
| 9,589,323 | B1 | 3/2017 | Choudhury et al. | |
| 2010/0074548 | A1* | 3/2010 | Pan .......................... | G06T 5/75 382/260 |
| 2011/0135217 | A1 | 6/2011 | Su et al. | |
| 2012/0082396 | A1 | 4/2012 | Crandall et al. | |
| 2013/0003832 | A1 | 1/2013 | Li et al. | |

OTHER PUBLICATIONS

Zhang, Buyue, and Jan P. Allebach. "Adaptive bilateral filter for sharpness enhancement and noise removal." IEEE, cited in IDS. (Year: 2008).*

(Continued)

*Primary Examiner* — Oneal R Mistry
*Assistant Examiner* — Nhut Huy Pham
(74) *Attorney, Agent, or Firm* — Potomac Law Group, PLLC; Vincent M DeLuca

(57) ABSTRACT

Methods and processing modules apply adaptive sharpening, for a block of input pixels for which upsampling is performed, to determine a block of output pixels. A block of upsampled pixels is obtained based on the block of input pixels. One or more range kernels is determined based on a plurality of upsampled pixels of the block of upsampled pixels. Each of the one or more range kernels is combined with a sharpening kernel to determine one or more bilateral sharpening kernels. The one or more bilateral sharpening kernels are used to determine the output pixels of the block of output pixels.

20 Claims, 13 Drawing Sheets

(56) References Cited

OTHER PUBLICATIONS

Yang, Kui, Yan Zhao, and Nianmao Deng. “Fast bilateral filtering using the discrete cosine transform and the recursive method.” Optik 126.6 (Year: 2015).*

Zhang, Buyue, and Jan P. Allebach. “Adaptive bilateral filter for sharpness enhancement and noise removal.” IEEE (Year: 2018).*

Gunturk, Bahadir K. “Bilateral filter: Theory and applications.” Computational Photography: Methods and Applications 2 (Year: 2010).*

Newton; “Efficient Image Resizing With ImageMagick”; Retrieved from the Internet: URL:https://www.smashingmagazine.com/2015/06/efficient-image-resizing-with-imagemagick/; Jun. 25, 2015; pp. 1-33.

Zhang et al; “Adaptive Bilateral Filter for Sharpness Enhancement and Noise Removal”; IEEE Transactions on Image Processing; vol. 17; No. 5; May 2008; pp. 664-678.

Dai et al., “Entropy-based bilateral filtering with a new range kernel,” Signal Processing 137 (2017) pp. 223-234, available from https://doi.org/10.1016/j.sigpro.2017.02.005 and from http://cstaodai.com/pdf/l 7 entropy_BF.pdf.

dpreview.com; “Sharpen before or after image resizing?”; forum started Mar. 2001, available from https://www.dpreview.com/forums/thread/65583 [accessed Apr. 8, 2025] (dpreview.com); https://www.dpreview.com/forums/post/876348; pp. 1-5.

Polesel et al; “Image Enhancement via Adaptive Unsharp Masking”; IEEE Transaction on Image Processing; vol. 9; No. 3; Mar. 2000; pp. 505-510.

Toh et al; “Locally Adaptive Bilateral Clustering for Image Deblurring and Sharpness Enhancement”; IEEE Transactions on Consumer Electronics; vol. 57; No. 3; pp. 1227-1235.

* cited by examiner

ADAPTIVE SHARPENING FOR BLOCKS OF UPSAMPLED PIXELS

CROSS-REFERENCE TO RELATED APPLICATIONS AND CLAIM OF PRIORITY

This application claims foreign priority under 35 U.S.C. 119 from United Kingdom patent application No. 2214438.0 filed on 30 Sep. 2022, which is incorporated by reference herein in its entirety.

FIELD

The present disclosure is directed to applying adaptive sharpening for blocks of upsampled pixels, e.g. for super resolution techniques.

BACKGROUND

The term 'super resolution' refers to techniques of upsampling an image that enhance the apparent visual quality of the image, e.g. by estimating the appearance of a higher resolution version of the image. When implementing super resolution, a system will attempt to find a higher resolution version of a lower resolution input image that is maximally plausible and consistent with the lower-resolution input image. Super resolution is a challenging problem because, for every patch in a lower-resolution input image, there is a very large number of potential higher-resolution patches that could correspond to it. In other words, super resolution techniques are trying to solve an ill-posed problem, since although solutions exist, they are not unique.

Super resolution has important applications. It can be used to increase the resolution of an image, thereby increasing the 'quality' of the image as perceived by a viewer. Furthermore, it can be used as a post-processing step in an image generation process, thereby allowing images to be generated at lower resolution (which is often simpler and faster) whilst still resulting in a high quality, high resolution image. An image generation process may be an image capturing process, e.g. using a camera. Alternatively, an image generation process may be an image rendering process in which a computer, e.g. a graphics processing unit (GPU), renders an image of a virtual scene. Compared to using a GPU to render a high resolution image directly, allowing a GPU to render a low resolution image and then applying a super resolution technique to upsample the rendered image to produce a high resolution image has potential to significantly reduce the latency, bandwidth, power consumption, silicon area and/or compute costs of the GPU. GPUs may implement any suitable rendering technique, such as rasterization or ray tracing. For example, a GPU can render a 960×540 image (i.e. an image with 518,400 pixels arranged into 960 columns and 540 rows) which can then be upsampled by a factor of 2 in both horizontal and vertical dimensions (which is referred to as '2× upsampling') to produce a 1920×1080 image (i.e. an image with 2,073,600 pixels arranged into 1920 columns and 1080 rows). In this way, in order to produce the 1920×1080 image, the GPU renders an image with a quarter of the number of pixels. This results in very significant savings (e.g. in terms of latency, power consumption and/or silicon area of the GPU) during rendering and can for example allow a relatively low-performance GPU to render high-quality, high-resolution images within a low power and area budget, provided a suitably efficient and high-quality super-resolution implementation is used to perform the upsampling.

FIG. 1 illustrates an upsampling process. An input image 102, which has a relatively low resolution, is processed by a processing module 104 to produce an output image 106 which has a relatively high resolution. Each of the black dots in the input image 102 and in the output image 106 represents a pixel. In the example shown in FIG. 1, the processing module 104 applies 2× upsampling such that the output image 106 has twice as many rows of pixels and twice as many columns of pixels as the input image 102. In other examples, different upsampling factors (other than 2×) may be applied.

In some systems, the processing module 104 may implement a neural network to upsample the input image 102 to produce the upsampled output image 106. Implementing a neural network may produce good quality output images, but often requires a high performance computing system (e.g. with large, powerful processing units and memories) to implement the neural network. Furthermore, the neural network needs to be trained, and depending on the training the neural network may only be suitable for processing some input images. As such, implementing a neural network for performing upsampling of images may be unsuitable for reasons of processing time, latency, bandwidth, power consumption, memory usage, silicon area and compute costs. These considerations of efficiency are particularly important in some devices, e.g. small, battery operated devices with limited compute and bandwidth resources, such as mobile phones and tablets.

Some systems therefore do not use a neural network for performing super resolution on images, and instead use more conventional processing modules. For example, some systems split the problem into two stages: (i) upsampling and (ii) adaptive sharpening. The upsampling stage can be performed cheaply, e.g. using bilinear upsampling, and the adaptive sharpening stage can be used to sharpen the image, i.e. reduce the blurring introduced by the upsampling. FIG. 2 is a flow chart for a process of performing super resolution by performing upsampling and adaptive sharpening in two stages of processing.

In step S202 the input image is received at the processing module 104. FIG. 1 shows a simplified example in which the input image has 36 pixels arranged in a 6×6 block of input pixels, but in a more realistic example the input image may be a 960×540 image. The input image could be another shape and/or size.

In step S204 the processing module 104 upsamples the input image using, for example, a bilinear upsampling process. Bilinear upsampling is known in the art and uses linear interpolation of adjacent input pixels in two dimensions to produce output pixels at positions between input pixels. For example, when implementing 2× upsampling: (i) to produce an output pixel that is halfway between two input pixels in the same row, the average of those two input pixels is determined; (ii) to produce an output pixel that is halfway between two input pixels in the same column, the average of those two input pixels is determined; and (iii) to produce an output pixel that is not in the same row or column as any of the input pixels, the average of the four nearest input pixels is determined. The upsampled image that is produced in step S204 is stored in some memory within the processing module 104.

In step S206 the processing module 104 applies adaptive sharpening to the upsampled image to produce an output image. The output image is a sharpened, upsampled image.

The adaptive sharpening is achieved by applying an adaptive kernel to regions of upsampled pixels in the upsampled image, wherein the weights of the kernel are adapted based on the local region of upsampled pixels of the upsampled image to which the kernel is applied, such that different levels of sharpening are applied to different regions of upsampled pixels depending on local context.

In step S208 the sharpened, upsampled image 106 is output from the processing module 104.

General aims for systems implementing super resolution are: (i) high quality output images, i.e. for the output images to be maximally plausible given the low resolution input images, (ii) low latency so that output images are generated quickly, (iii) a low cost processing module in terms of resources such as power, bandwidth and silicon area.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided a method of applying adaptive sharpening, fora block of input pixels for which upsampling is performed, to determine a block of output pixels, the method comprising:

- obtaining a block of upsampled pixels based on the block of input pixels;
- determining one or more range kernels based on a plurality of upsampled pixels of the block of upsampled pixels;
- combining each of the one or more range kernels with a sharpening kernel to determine one or more bilateral sharpening kernels; and
- using the one or more bilateral sharpening kernels to determine the output pixels of the block of output pixels.

Said using the one or more bilateral sharpening kernels to determine the output pixels of the block of output pixels may comprise applying the one or more bilateral sharpening kernels after said combining each of the one or more range kernels with a sharpening kernel to determine the one or more bilateral sharpening kernels.

The sharpening kernel may be an unsharp mask kernel.

The unsharp mask kernel may have a plurality of unsharp mask values, wherein the unsharp mask value K(x) at a position, x, relative to the centre of the unsharp mask kernel may have a value given by K(x)=I(x)+s (x)−G(x)), where I(x) is a value at position x within an identity kernel representing the identity function, and where G(x) is a value at position x within a spatial Gaussian kernel representing a spatial Gaussian function, and s is a scale factor, wherein the unsharp mask kernel, the identity kernel and the spatial Gaussian kernel may be the same size and shape as each other. The spatial Gaussian function may be of the form $$G(x) = Ae^{-\frac{x^2}{2\sigma_{spatial}^2}},$$

where $\sigma_{spatial}$ is a parameter representing a standard deviation of the spatial Gaussian function, and where A is a scalar value.

Each of the one or more range kernels may have a plurality of range kernel values, wherein the range kernel value R (x) at a position, x, of the range kernel may be given by a range Gaussian function. The range Gaussian function may be of the form $$R(I(x_i) - I(x)) = Be^{-\frac{(I(x_i)-I(x))^2}{2\sigma_{range}^2}},$$

where I(x) is the value of the upsampled pixel at position x in the block of upsampled pixels, where $I(x_i)$ is the value of the upsampled pixel at a position corresponding to the centre of the range kernel, where $\sigma_{range}$ is a parameter representing the standard deviation of the range Gaussian function, and where B is a scalar value.

Each of the one or more range kernels, the sharpening kernel and each of the one or more bilateral sharpening kernels may be the same size and shape as each other.

Each of the one or more range kernels may be combined with the sharpening kernel by performing elementwise multiplication to determine the one or more bilateral sharpening kernels.

The method may further comprise normalising each of the one or more bilateral sharpening kernels prior to said using the one or more bilateral sharpening kernels to determine the output pixels of the block of output pixels.

Said obtaining a block of upsampled pixels may comprise upsampling the block of input pixels. Said upsampling the block of input pixels may comprise performing bilinear upsampling on the block of input pixels. For example, performing bilinear upsampling on the block of input pixels may comprise performing a convolution transpose operation on the block of input pixels using a bilinear kernel.

Said obtaining a block of upsampled pixels may comprise receiving the block of upsampled pixels.

Said determining one or more range kernels may comprise determining a plurality of range kernels, and said determining a plurality of range kernels may comprise determining, for each of a plurality of partially overlapping sub-blocks of upsampled pixels within the block of upsampled pixels, a respective range kernel based on the upsampled pixels of that sub-block of upsampled pixels.

Said using the one or more bilateral sharpening kernels to determine the output pixels of the block of output pixels may comprise determining each of the output pixels by applying to a respective one of the plurality of partially overlapping sub-blocks of upsampled pixels, the respective bilateral sharpening kernel that was determined by combining the respective range kernel determined for that sub-block of upsampled pixels with the sharpening kernel.

The block of input pixels may be an m×m block of input pixels; the block of upsampled pixels may be a n×n block of upsampled pixels; each of the sub-blocks of upsampled pixels may be a p×p sub-block of upsampled pixels; each of the range kernels may be a p×p range kernel; the sharpening kernel may be a p×p sharpening kernel; each of the bilateral sharpening kernels may be a p×p bilateral sharpening kernel; and the block of output pixels may be a q×q block of output pixels. In examples described herein n>m, and it may be the case that n=p+1 and p may be odd. In one example, m=4, n=6, p=5 and q=2. In another example, m=5, n=8, p=7 and q=2.

Said determining one or more range kernels may comprise determining a single range kernel based on upsampled pixels of the block of upsampled pixels, and a single bilateral sharpening kernel may be determined by combining the single range kernel with the sharpening kernel.

Said using the one or more bilateral sharpening kernels to determine the output pixels of the block of output pixels may comprise:

using the single bilateral sharpening kernel to determine a plurality of bilateral sharpening subkernels by performing kernel decomposition; and applying each of the bilateral sharpening subkernels to the block of input pixels to determine respective output pixels of the block of output pixels.

Said using the single bilateral sharpening kernel to determine a plurality of bilateral sharpening subkernels by performing kernel decomposition may comprise: upsampling the single bilateral sharpening kernel; and deinterleaving the values of the upsampled bilateral sharpening kernel to determine the plurality of bilateral sharpening subkernels. The method may further comprise normalising the bilateral sharpening subkernels.

The method may further comprise padding the upsampled bilateral sharpening kernel with one or more rows and/or one or more columns of zeros prior to deinterleaving the values of the upsampled bilateral sharpening kernel to determine the plurality of bilateral sharpening subkernels.

The block of input pixels may be an m×m block of input pixels; the block of upsampled pixels may be a n×n block of upsampled pixels; the single range kernel may be a p×p range kernel; the sharpening kernel may be a p×p sharpening kernel; the bilateral sharpening kernel may be a p×p bilateral sharpening kernel; the block of output pixels may be a q×q block of output pixels; the upsampled bilateral sharpening kernel may be a u×u upsampled bilateral sharpening kernel; the padded upsampled bilateral sharpening kernel may be a t×t padded upsampled bilateral sharpening kernel; each of the bilateral sharpening subkernels may be a m×m bilateral sharpening subkernel; and the number of bilateral sharpening subkernels may be v. In examples described herein n>m, and it may be the case that t mod v=0, and p may be odd. As an example, m=4, q=2, n=7, p=5, u=7, t=8, v=4.

Said determining one or more range kernels may comprise determining a single range kernel based on the upsampled pixels of one sub-block of upsampled pixels from a plurality of partially overlapping sub-blocks of upsampled pixels within the block of upsampled pixels, and wherein a single bilateral sharpening kernel may be determined by combining the single range kernel with the sharpening kernel. Said using the one or more bilateral sharpening kernels to determine the output pixels of the block of output pixels may comprise determining each of the output pixels by applying the single bilateral sharpening kernel to a respective one of the plurality of partially overlapping sub-blocks of upsampled pixels.

The method may further comprise outputting the block of output pixels for storage in a memory, for display or for transmission.

There is provided a processing module configured to apply adaptive sharpening, for a block of input pixels for which upsampling is performed, to determine a block of output pixels, the processing module comprising output pixel determination logic configured to:

receive a block of upsampled pixels based on the block of input pixels;

determine one or more range kernels based on a plurality of upsampled pixels of the block of upsampled pixels;

combine each of the one or more range kernels with a sharpening kernel to determine one or more bilateral sharpening kernels; and use the one or more bilateral sharpening kernels to determine the output pixels of the block of output pixels.

The processing module may further comprise upsampling logic configured to determine the block of upsampled pixels based on the block of input pixels and to provide the block of upsampled pixels to the output pixel determination logic.

The output pixel determination logic may be further configured to:

determine an indication of contrast for the block of input pixels; and if the determined indication of contrast for the block of input pixels is below a threshold:

combine each of the one or more range kernels with a spatial Gaussian kernel to determine one or more bilateral smoothing kernels; and use the one or more bilateral smoothing kernels instead of the one or more bilateral sharpening kernels to determine the output pixels of the block of output pixels.

The output pixel determination logic may be configured to determine the indication of contrast by:

identifying a minimum pixel value and a maximum pixel value within the block of input pixels or within the block of upsampled pixels values; and determining a difference between the identified minimum and maximum pixel values.

There may be provided a processing module configured to perform any of the methods described herein.

There may be provided a method of applying adaptive sharpening, for a block of input pixels for which upsampling is performed, to determine a block of output pixels, the method comprising:

obtaining a block of upsampled pixels based on the block of input pixels; and for each of a plurality of partially overlapping sub-blocks of upsampled pixels within the block of upsampled pixels:

determining a range kernel based on the upsampled pixels of the sub-block of upsampled pixels;

combining the range kernel with a sharpening kernel to determine a bilateral sharpening kernel; and determining one of the output pixels of the block of output pixels by applying the bilateral sharpening kernel to the sub-block of upsampled pixels.

There may be provided a processing module configured to apply adaptive sharpening, for a block of input pixels for which upsampling is performed, to determine a block of output pixels, the processing module comprising output pixel determination logic configured to:

receive a block of upsampled pixels based on the block of input pixels; and for each of a plurality of partially overlapping sub-blocks of upsampled pixels within the block of upsampled pixels:

determine a range kernel based on the upsampled pixels of the sub-block of upsampled pixels;

combine the range kernel with a sharpening kernel to determine a bilateral sharpening kernel; and determine one of the output pixels of the block of output pixels by applying the bilateral sharpening kernel to the sub-block of upsampled pixels.

There may be provided a method of applying adaptive sharpening, for a block of input pixels for which upsampling is performed, to determine a block of output pixels, the method comprising:

obtaining a block of upsampled pixels based on the block of input pixels;

determining a range kernel based on a plurality of upsampled pixels of the block of upsampled pixels;

combining the range kernel with a sharpening kernel to determine a bilateral sharpening kernel;

using the bilateral sharpening kernel to determine a plurality of bilateral sharpening subkernels by performing kernel decomposition; and applying each of the bilateral sharpening subkernels to the block of input pixels to determine respective output pixels of the block of output pixels.

There may be provided a processing module configured to apply adaptive sharpening, for a block of input pixels for which upsampling is performed, to determine a block of output pixels, the processing module comprising output pixel determination logic configured to:

receive a block of upsampled pixels based on the block of input pixels;

determine a range kernel based on a plurality of upsampled pixels of the block of upsampled pixels;

combine the range kernel with a sharpening kernel to determine a bilateral sharpening kernel;

use the bilateral sharpening kernel to determine a plurality of bilateral sharpening subkernels by performing kernel decomposition; and apply each of the bilateral sharpening subkernels to the block of input pixels to determine respective output pixels of the block of output pixels.

There may be provided a method of applying adaptive sharpening, for a block of input pixels for which upsampling is performed, to determine a block of output pixels, the method comprising:

obtaining a block of upsampled pixels based on the block of input pixels;

determining a range kernel based on the upsampled pixels of one sub-block of upsampled pixels from a plurality of partially overlapping sub-blocks of upsampled pixels within the block of upsampled pixels;

combining the range kernel with a sharpening kernel to determine a bilateral sharpening kernel; and determining each of the output pixels of the block of output pixels by applying the bilateral sharpening kernel to a respective one of the plurality of partially overlapping sub-blocks of upsampled pixels.

There may be provided a processing module configured to apply adaptive sharpening, for a block of input pixels for which upsampling is performed, to determine a block of output pixels, the processing module comprising output pixel determination logic configured to:

receive a block of upsampled pixels based on the block of input pixels;

determine a range kernel based on the upsampled pixels of one sub-block of upsampled pixels from a plurality of partially overlapping sub-blocks of upsampled pixels within the block of upsampled pixels;

combine the range kernel with a sharpening kernel to determine a bilateral sharpening kernel; and determine each of the output pixels of the block of output pixels by applying the bilateral sharpening kernel to a respective one of the plurality of partially overlapping sub-blocks of upsampled pixels.

The processing module may be embodied in hardware on an integrated circuit. There may be provided a method of manufacturing, at an integrated circuit manufacturing system, a processing module. There may be provided an integrated circuit definition dataset that, when processed in an integrated circuit manufacturing system, configures the system to manufacture a processing module. There may be provided a non-transitory computer readable storage medium having stored thereon a computer readable description of a processing module that, when processed in an integrated circuit manufacturing system, causes the integrated circuit manufacturing system to manufacture an integrated circuit embodying a processing module.

There may be provided an integrated circuit manufacturing system comprising: a non-transitory computer readable storage medium having stored thereon a computer readable description of the processing module; a layout processing system configured to process the computer readable description so as to generate a circuit layout description of an integrated circuit embodying the processing module; and an integrated circuit generation system configured to manufacture the processing module according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
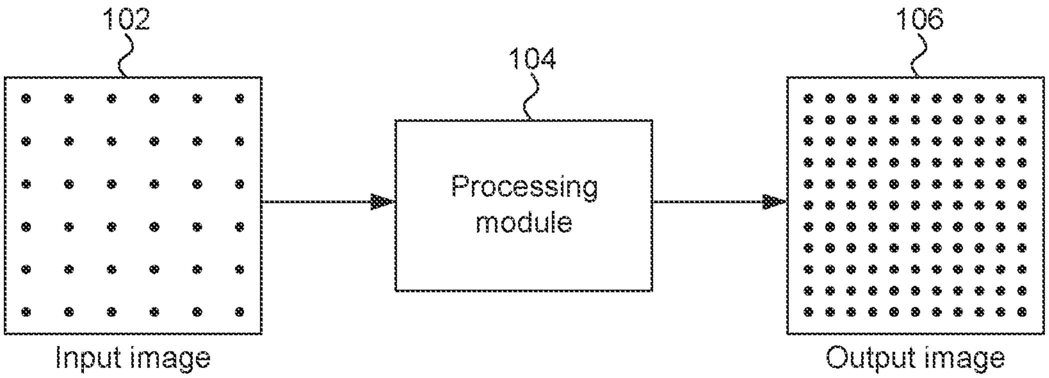
FIG. 1 illustrates an upsampling process.
Figure 2:
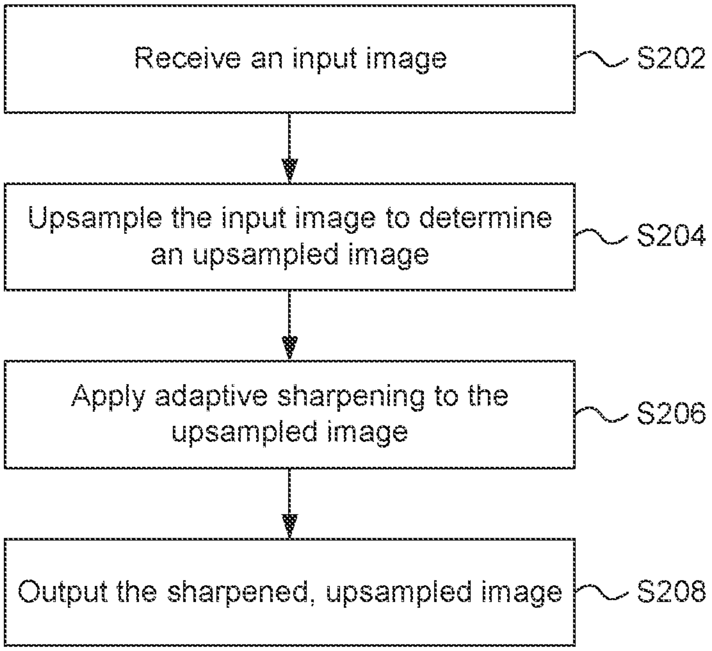
FIG. 2 is a flow chart for a process of performing super resolution by performing upsampling and adaptive sharpening in two stages of processing.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only. The super resolution techniques described herein implement upsampling and adaptive sharpening. It is noted that the memory in the system described in the background section that is used to store the upsampled image that is produced in step S204 takes up a significant amount of silicon area, and writing data to and reading data from the memory adds significant latency, bandwidth and power consumption to that system. Here "bandwidth" refers to the amount of data that is transferred to and from the memory per unit time. In contrast, in examples described herein a memory for storing an upsampled image prior to applying adaptive sharpening is not needed. Furthermore, examples described herein provide improvements to the adaptive sharpening process. In particular, examples described herein provide high quality results (in terms of the high resolution output pixels being highly plausible given the low resolution input images, with a reduction in artefacts such as blurring in the output image) and can be implemented in more efficient systems with reduced latency, power consumption and/or silicon area compared to prior art super resolution systems.

Bilateral filters are known to those skilled in the art. A conventional bilateral filter is an edge-preserving smoothing filter, which replaces the intensity of each pixel with a weighted average of intensity values from nearby pixels. The weights are typically based on a Gaussian function, wherein the weights depend not only on Euclidean distance between pixel locations, but also on the differences in intensity. This preserves sharp edges in an image, i.e. it avoids blurring over sharp edges between regions having significantly different intensities. A conventional bilateral filter is composed of two kernels: (i) a spatial Gaussian kernel that performs Gaussian smoothing, and (ii) a range kernel that rejects significantly different pixels.

For example, a bilateral filter may be defined as:

$$I^{filtered}(x) = \frac{1}{W}\sum_{x_i \in \Omega} I(x_i)R(I(x_i) - I(x))G(x_i - x)$$

where W is a normalisation term and is defined as $W=\Sigma_{x_i \in \Omega}R(I(x_i)-I(x))G(x_i-x)$, where $I^{filtered}$ is the filtered image, I is the input image to be filtered, x are the coordinates of the current pixel to be filtered, Ω is the window centred on x so $x_i \in \Omega$ is a pixel location in the window, R is the range kernel and G is the spatial Gaussian kernel.

In examples described herein, a bilateral adaptive sharpening approach is implemented, e.g. for super resolution techniques. Rather than combining the range kernel with a spatial Gaussian smoothing kernel, the range kernel is combined with a sharpening kernel (e.g. an unsharp mask kernel) to create a bilateral sharpening kernel. The bilateral sharpening kernel can then be used to determine the output pixels. The range kernel is determined based on a particular block of input pixels that is being upsampled and sharpened so the bilateral sharpening kernel depends upon the block of input pixels being sharpened, and as such the sharpening that is applied is "adaptive" sharpening. Furthermore, the use of the range kernel means that more sharpening is applied to regions of low contrast (i.e. regions in which the range kernel has a relatively high value) and less sharpening is applied to regions of high contrast (i.e. regions in which the range kernel has a relatively low value). Applying more sharpening to regions of low contrast in the image than to regions of high contrast in the image can enhance the appearance of detail in regions of low contrast. Furthermore, the use of the bilateral sharpening kernel (in particular due to the range kernel) avoids or reduces overshoot artefacts which can occur when too much sharpening is applied in regions of high contrast using other sharpening techniques (e.g. around edges between regions with large differences in pixel value).

The format of the pixels could be different in different examples. For example, the pixels could be in YUV format, and the upsampling may be applied to each of the Y, U and V channels separately. The Y channel can be adaptively sharpened as described herein. The human visual system is not as perceptive to detail at high spatial frequencies in the U and V channels as in the Y channel, so the U and V channels may or may not be adaptively sharpened. If the input pixel data is in RGB format then it could be converted into YUV format (e.g. using a known colour space conversion technique) and then processed as data in Y, U and V channels. Alternatively, if the input pixel data is in RGB format then the techniques described herein could be implemented on the R, G and B channels as described herein, wherein the G channel may be considered to be a proxy for the Y channel.

Figure 3:
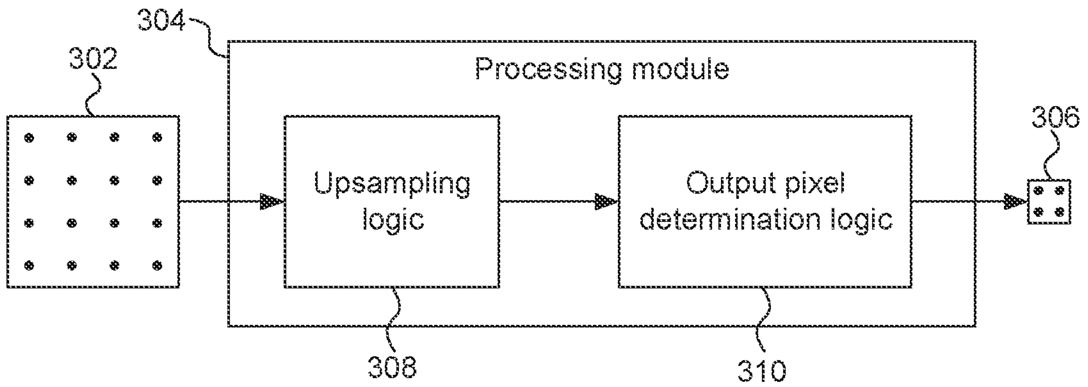
FIG. 3 shows a processing module configured to upsample a block of input pixels and apply adaptive sharpening to determine a block of output pixels.

FIG. 3 shows a processing module 304 configured to apply upsampling and adaptive sharpening to a block of input pixels 302 to determine a block of output pixels 306, e.g. for implementing a super resolution technique. The processing module 304 comprises upsampling logic 308 and output pixel determination logic 310. The logic of the processing module 304 may be implemented in hardware, software or a combination thereof. A hardware implementation normally provides for a reduced latency compared to a software implementation, at the cost of inflexibility of operation. The processing module 304 is likely to be used in the same manner lots of times, and reduced latency is very important in a super resolution application, so it is likely that implementing the logic of the processing module 304 in hardware (e.g. in fixed function circuitry) will be preferable to implementing the logic in software, but a software implementation is still possible and may be preferable in some situations.

Figure 4:
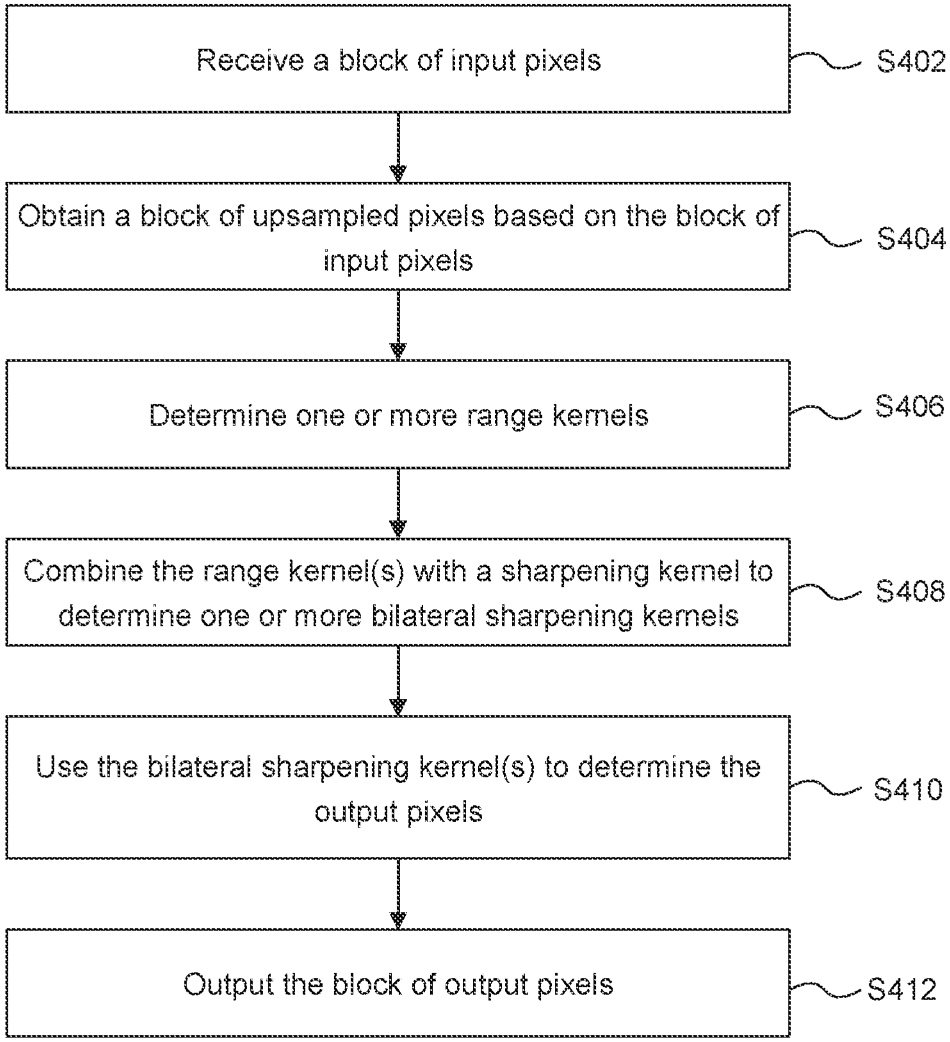
FIG. 4 is a flow chart for a method of applying adaptive sharpening, for a block of input pixels for which upsampling is performed, to determine a block of output pixels.

A method of using the processing module 304 to apply adaptive sharpening, for a block of input pixels 302 for which upsampling is performed, to determine a block of output pixels 306, e.g. for implementing a super resolution technique, is described with reference to the flow chart of FIG. 4. The flow chart of FIG. 4 provides a high level description of the methods described herein, examples of implementations of which are described in more detail below with reference to other flow charts. Sharpening is described as "adaptive" if it can be adapted for different blocks of input pixels, e.g. based on the intensities of input pixels in the block of input pixels. For example, as described below, the sharpening applied to a block of input pixels for which upsampling is performed may be dependent upon one or more range kernel(s) which are determined based on upsampled pixels which are determined from the block of input pixels 302. For example, output pixels may be sharpened to a greater extent in low contrast areas, and to a lesser extent in high contrast areas. This can help to reduce blur in low-contrast image regions by allowing low-contrast image regions to be sharpened to a greater extent. Furthermore, the use of the bilateral sharpening kernels described herein avoids or reduces overshoot artefacts which can be particularly noticeable when other (e.g. spatially invariant or non-adaptive) sharpening techniques are used to apply sharpening to high-contrast image regions.

In step S402 the block of input pixels 302 is received at the processing module 304. The block of input pixels 302 may for example be a 4×4 block of input pixels (as shown in FIG. 3), but in other examples the shape and/or size of the block of input pixels may be different. The block of input pixels 302 is part of an input image. As described above, as an example, an input image may be a 960×540 image (i.e. an image with 518,400 pixels arranged into 960 columns and 540 rows). The input image may be captured (e.g. by a camera) or may be a computer generated image, e.g. a rendered image of a scene which has been rendered by a GPU using a rendering technique such as rasterization or ray tracing. The block of input pixels 302 is passed to the upsampling logic 308.

In step S404 the upsampling logic 308 determines a block of upsampled pixels based on the block of input pixels 302. The output pixels of the block of output pixels 306 are upsampled pixels (relative to the input pixels of the block of input pixels 302). The upsampling logic 308 could determine the block of upsampled pixels according to any suitable technique, such as by performing bilinear upsampling on the block of input pixels 302. Techniques for performing upsampling, such as bilinear upsampling are known to those skilled in the art. For example, bilinear upsampling may be performed by performing a convolution transpose operation on the block of input pixels using a bilinear kernel (e.g. a 3×3 bilinear kernel of the form $$\left.\begin{bmatrix} 0.25 & 0.5 & 0.25 \\ 0.5 & 1 & 0.5 \\ 0.25 & 0.25 & 0.25 \end{bmatrix}\right).$$

The block of upsampled pixels represents a higher resolution version of at least part of the block of input pixels. The upsampled pixels of the block of upsampled pixels determined by the upsampling logic 308 are not sharp. In particular, the upsampling process performed by the upsampling logic 308 (e.g. bilinear upsampling) may result in blurring in the upsampled pixels. The block of upsampled pixels is passed to, and received by, the output pixel determination logic 310. As described below, the output pixel determination logic 310 is configured to apply adaptive sharpening to the block of upsampled pixels.

The processing module 304 is configured to obtain the block of upsampled pixels by determining the block of upsampled pixels using the upsampling logic 308. In other examples, the processing module 304 could obtain the block of upsampled pixels by receiving the block of upsampled pixels which have been determined somewhere other than on the processing module 304.

In step S406 the output pixel determination logic 310 determines one or more range kernels based on a plurality of upsampled pixels of the block of upsampled pixels. Each of the one or more range kernels, R, has a plurality of range kernel values, wherein the range kernel value $R(I(x_i)-I(x))$ at a position, x, of the range kernel may be given by a range Gaussian function. Although in the examples described herein the range kernel values are given by a range Gaussian function, in other examples the range kernel values may be given by a different (e.g. non-Gaussian) function.

A range kernel is defined in image-space, i.e. it has range kernel values for respective upsampled pixel positions.

However, the range Gaussian function has a Gaussian form in 'intensity-space' rather than in image-space. For example, the range Gaussian function may be of the form $$R(I(x_i) - I(x)) = Be^{-\frac{(I(x_i)-I(x))^2}{2\sigma_{range}^2}},$$

where I(x) is the value of the upsampled pixel at position x in the block of upsampled pixels, where $I(x_i)$ is the value of the upsampled pixel at a position corresponding to the centre of the range kernel, where $\sigma_{range}$ is a parameter representing the standard deviation of the range Gaussian function, and where B is a scalar value. As an example, B may be 1. Where $R(I(x_i)-I(x))$ is used in a normalised bilateral filter as described above, the choice of B may essentially be arbitrary, since it would be cancelled out during normalisation of the bilateral filter's weights.

Since the range kernels are determined based on the upsampled pixels their resolution and alignment matches the intensities in the upsampled image better than if the range kernels were determined based on the input pixels (i.e. the non-upsampled pixels). This was found to be beneficial because mismatches in the resolution or alignment between the range kernels and the upsampled pixels may result in visible errors when combined with the sharpening kernel. For example, such errors may include "shadowing", where an edge in the range kernel would be misplaced by a fixed amount corresponding to the offset between the input and upsampled images, creating a dark shadow or corresponding bright highlight along the output edge in the upsampled image.

In step S408 the output pixel determination logic 310 combines each of the one or more range kernels with a sharpening kernel to determine one or more bilateral sharpening kernels. Each of the one or more range kernels is combined with the same sharpening kernel to determine a respective bilateral sharpening kernel. Each of the one or more range kernels may be combined with the sharpening kernel by performing elementwise multiplication to determine the respective bilateral sharpening kernel. In the examples described herein the range kernel(s), the sharpening kernel and the bilateral sharpening kernel(s) are the same size and shape as each other.

The sharpening kernel may be an unsharp mask kernel. In other examples, the sharpening kernel may be a different type of sharpening kernel, e.g. the sharpening kernel could be constructed by finding a least-squares optimal inverse to a given blur kernel. Unsharp masking is a known technique for applying sharpening. Conceptually, according to an unsharp masking technique: (i) a blurred version of an input image is determined, e.g. by convolving the image with a Gaussian kernel, wherein the width of the Gaussian kernel defines the amount of blurring that is applied, (ii) the difference between the original input image and the blurred image is determined, and (iii) the determined difference is multiplied by a (usually predetermined) scale factor and added to the original input image to determine the sharpened image. In this way the "unsharp" (i.e. blurred) version of the image is "masked" (i.e. subtracted) which is why the sharpening technique is called "unsharp masking". Unsharp masking is an effective way of sharpening an image but, as a spatially invariant linear high-boost filter, it can introduce 'overshoot' artefacts around high-contrast edges, which can be detrimental to perceived image quality.

For example, an unsharp mask kernel, K, is determined as K=I+s(I−G), where I is an identity kernel representing the identity function; G is a spatial Gaussian kernel representing a spatial Gaussian function having a variance $\sigma^2$; and s is a scale factor. The unsharp mask kernel K, the identity kernel I and the spatial Gaussian kernel G are the same size and shape as each other, e.g. they may each be of size p×p where p is an integer. The unsharp mask kernel, K, has a plurality of unsharp mask values, wherein the unsharp mask value K(x) at a position, x, relative to the centre of the unsharp mask kernel has a value given by K(x)=I(x)+s(I(x)−G(x)), where I(x) is a value at position x within the identity kernel representing the identity function, and where G(x) is a value at position x within the spatial Gaussian kernel representing a spatial Gaussian function. There are two free parameters here, namely the scale factor s and the variance $\sigma^2$ of the Gaussian kernel G, which in some implementations may be exposed as tuneable parameters, and in others may be "baked into" the choice of fixed weights in the kernels for economy, simplicity, and ease of implementation. The variance, $\sigma^2$, governs the spatial extent of the sharpening effect applied to edges, and s governs the strength of the sharpening effect.

Figure 5A:
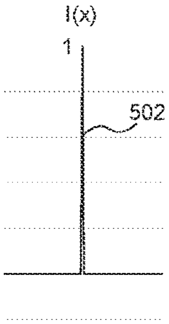
FIG. 5*a* illustrates an identity function for an identity kernel.

FIG. 5*a* illustrates an identity function for the identity kernel, I. The identity kernel has a value of 1 at the central position and a value of 0 at every other position. The sum of the values of the identity kernel is 1 so the identity kernel is normalised.

Figure 5B:
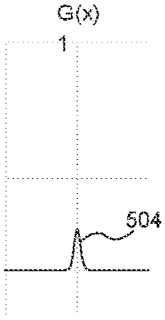
FIG. 5*b* illustrates a spatial Gaussian function for a spatial Gaussian kernel.

FIG. 5*b* illustrates a spatial Gaussian function for the spatial Gaussian kernel, G. The spatial Gaussian function is of the form $$G(x) = Ae^{-\frac{x^2}{2\sigma_{spatial}^2}},$$

where $\sigma_{spatial}$ is a parameter representing a standard deviation of the spatial Gaussian function, and where A is a scalar value that is chosen such that the sum of the values in the spatial Gaussian function is 1; that is, so that the spatial Gaussian kernel is normalised.

Figure 5C:
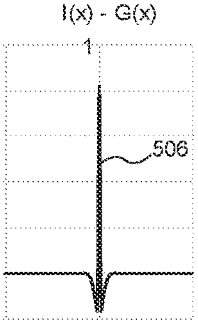
FIG. 5*c* illustrates the difference between the identity function and the spatial Gaussian function for a difference kernel.

FIG. 5*c* illustrates the difference between the identity function and the spatial Gaussian function for a difference kernel, (I−G). Where I and G are both normalised, the sum of the values of the difference kernel is 0.

Figure 5D:
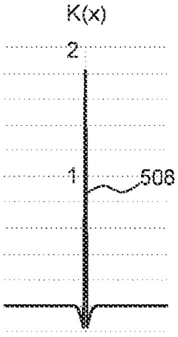
FIG. 5*d* illustrates an unsharp mask function for an unsharp mask kernel.

FIG. 5*d* illustrates an unsharp mask function for the unsharp mask kernel, K. As described above, K=I+s(I−G), and in this example the scale factor, s, is 1. Where I and G are both normalised, the sum of the values of the unsharp mask kernel is 1, so the unsharp mask kernel is also normalised. The unsharp mask value has a large positive value (e.g. a value above 1) at the central position and has small negative values close to the central position which decrease in magnitude further from the central position.

Figure 5E:
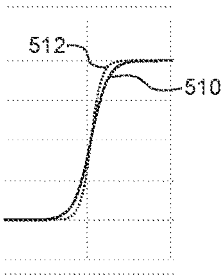
FIG. 5*e* shows a graph illustrating the brightness of an image across an edge in the image, and also illustrating an ideal brightness across a sharper version of the edge.

FIG. 5*e* shows a graph illustrating the brightness 510 of an image across an edge in the upsampled pixels representing the image. The dotted line 512 in the graph shown in FIG. 5*e* illustrates a brightness that may be considered to be an ideal brightness across a sharper version of the edge. In other words, when the edge in the upsampled pixels is sharpened, it would be ideal if the brightness profile could be changed from line 510 to line 512.

Figure 5F:
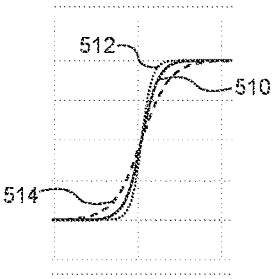
FIG. 5*f* shows the graph of FIG. 5*e* with an additional line to illustrate the brightness across a smoothed version of the edge in the image when the image has been smoothed using the spatial Gaussian kernel.

FIG. 5*f* shows the graph of FIG. 5*e* with an additional dashed line 514 to illustrate the brightness across a smoothed version of the edge in the image when the upsampled pixels have been smoothed using the spatial Gaussian kernel, G. In other words, if the spatial Gaussian kernel (with the Gaussian function 504 shown in FIG. 5*b*) was applied to the upsampled pixels, the brightness profile would change from line 510 to line 514. It can be seen in FIG. 5*f* that this will blur the edge rather than sharpen it.

Figure 5G:
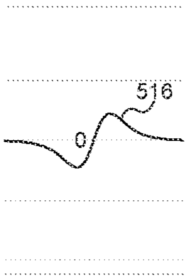
FIG. 5*g* illustrates the result of applying the difference kernel to the edge in the image.

FIG. 5*g* illustrates the result of applying the difference kernel (with the difference function 506 shown in FIG. 5*c*) to the upsampled pixels representing the edge in the image. In other words, if the difference kernel were applied to the upsampled pixels, the brightness profile would change from line 510 to line 516.

Figure 5H:
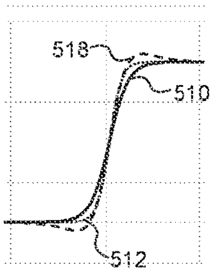
FIG. 5*h* shows the graph of FIG. 5*e* with an additional line to illustrate the brightness across a sharpened version of the edge in the image when the image has been sharpened using the unsharp mask kernel.

FIG. 5*h* shows the graph of FIG. 5*e* with an additional dashed line 518 to illustrate the brightness across a sharpened version of the edge in the image when the image has been sharpened using the unsharp mask kernel, K. In other words, if the unsharp mask kernel (with the unsharp mask function 508 shown in FIG. 5*d*) was applied to the upsampled pixels, the brightness profile would change from line 510 to line 518. It can be seen in FIG. 5*h* that this will sharpen the edge such that on the edge the line 518 is very close to the ideal sharpened line 512. However, it can also be seen that the unsharp mask kernel introduces ‘overshoot’ near to the edge, which can be seen in FIG. 5*h* where the line 518 deviates from the ideal line 512 either side of the edge. It is this overshoot which the present method described with reference to FIG. 4 can be considered as aiming to avoid, by means of combining the sharpening kernel with locally adaptive range kernel(s) which dampen its response across high-contrast edges.

In step S410 the output pixel determination logic 310 uses the one or more bilateral sharpening kernels to determine the output pixels of the block of output pixels. The output pixel determination logic 310 may use the one or more bilateral sharpening kernels to determine the output pixels of the block of output pixels in step S410 by applying the one or more bilateral sharpening kernels previously generated in step S408 by combining each of the one or more range kernels with a sharpening kernel. In other words, the one or more bilateral sharpening kernels are applied (in step S410) after the one or more range kernels are combined with a sharpening kernel to generate the one or more bilateral sharpening kernels (in step S408). Ways in which the bilateral sharpening kernels can be used to determine the output pixels are described in detail below with reference to different examples.

In some examples, between steps S408 and S410 there may be a step of normalising each of the one or more bilateral sharpening kernels. A kernel can be normalised by summing all of the values in the kernel and then dividing each of the values by the result of the sum to determine the values of the normalised kernel.

In step S412 the block of output pixels 306 is output from the output pixel determination logic 310, and output from the processing module 304. The output pixels in the block of output pixels have been upsampled and adaptively sharpened. When the block of upsampled pixels 306 has been output, then the method can be repeated for the next block of input pixels by striding across the input image with a stride of 1, and by striding the output by 2, such that a 2× upsampling is achieved. In other words, for each pixel of the input image we take a block of input pixels (e.g. a 4×4 block of input pixels) and we output a 2×2 block of (upsampled) output pixels. By doing this across the whole input image, the resolution of the image is doubled, i.e. the number of pixels is multiplied by four, and the upsampled pixels are adaptively sharpened. The pixels may be processed in raster scan order, i.e. in rows from top to bottom and within each row from left to right, or in any other suitable order, e.g. boustrophedon order or Morton order. After the block of output pixels 306 has been output from the processing module 304 it may be used in any suitable manner, e.g. it may be stored in a memory, displayed on a display or transmitted to another device. It is noted that in the processing module 304 the upsampling and adaptive sharpening may be performed for blocks of input pixels in a single pass through the processing module 304, rather than implementing a two-stage process of upsampling the whole, or part of, the input image and then sharpening the whole, or part of, the upsampled image, which may require some intermediate storage between the two stages to store the upsampled (but unsharpened) image. Furthermore, it is noted that in the examples described herein the block of output pixels is a 2×2 block of output pixels, but in other examples the block of output pixels could be a different size and/or shape.

Figure 6A:
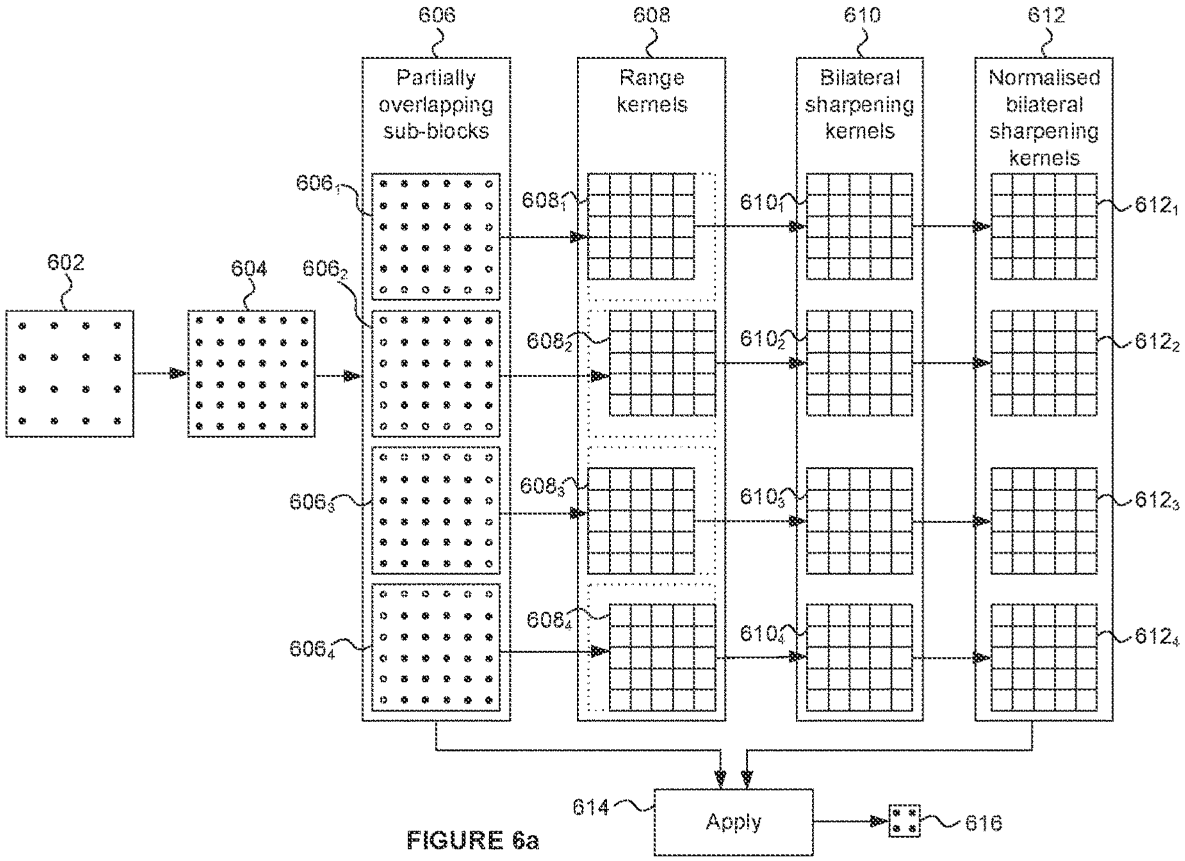
FIG. 6*a* illustrates a method performed by the processing module in a first embodiment of a first example of applying adaptive sharpening for a block of input pixels for which upsampling is performed to determine a block of output pixels.
Figure 6B:
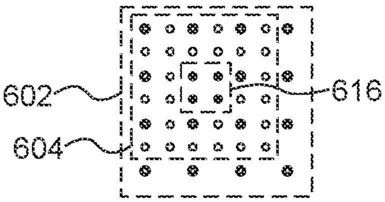
FIG. 6*b* illustrates how the block of output pixels determined by the processing module in FIG. 6*a* relates to the block of input pixels.

A first embodiment of a first example implementation is described with reference to FIGS. 6*a*, 6*b* and 7. FIG. 6*a* illustrates a method performed by the processing module 304 of applying adaptive sharpening for a block of input pixels 602 for which upsampling is performed to determine a block of output pixels 616, e.g. for implementing a super resolution technique. FIG. 6*b* illustrates how the block of output pixels 616 determined by the processing module 304 in FIG. 6*a* relates to the block of input pixels 602 and the block of upsampled pixels 604.

Figure 7:
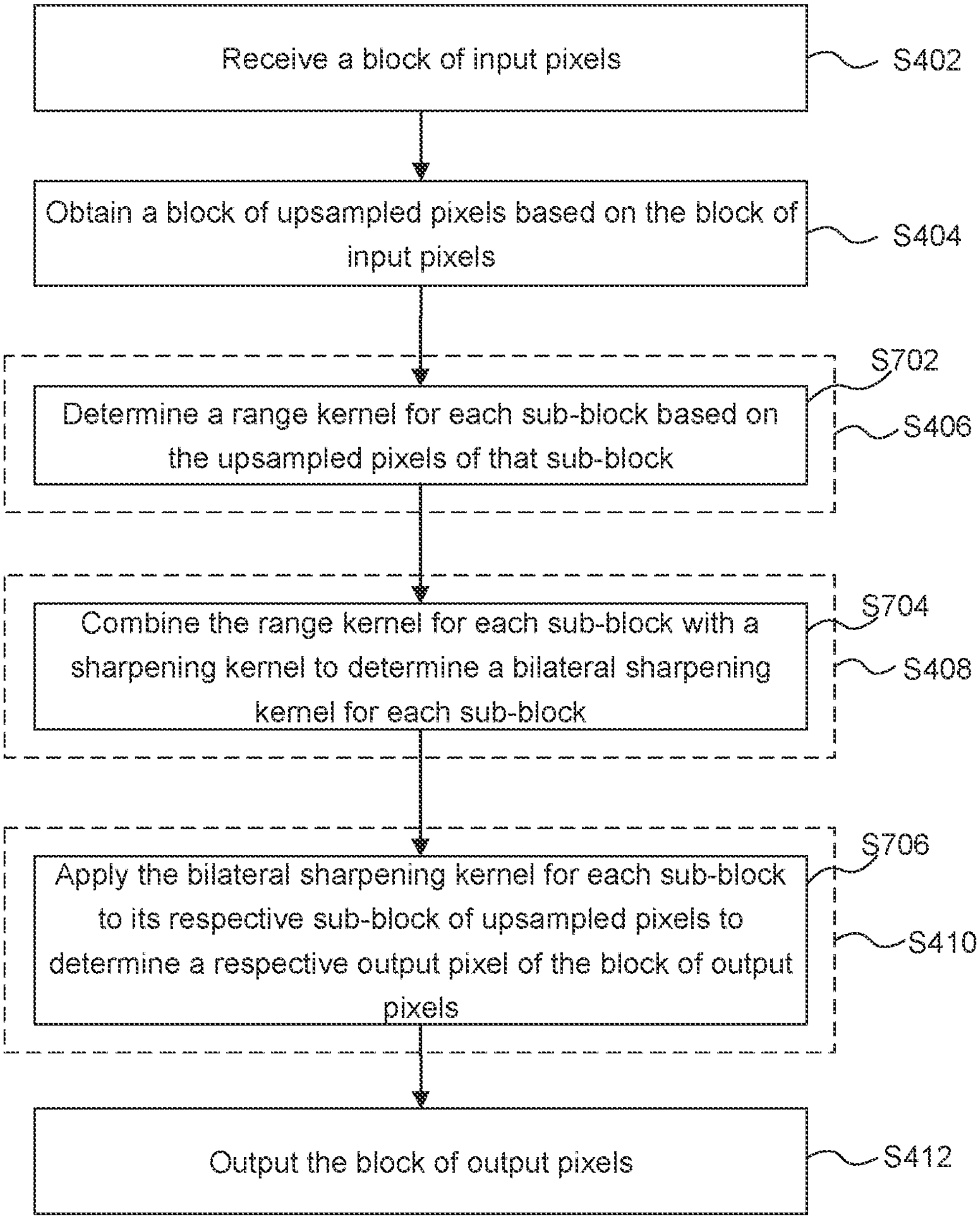
FIG. 7 is a flow chart for the method performed by the processing module in the first example of applying adaptive sharpening for a block of input pixels for which upsampling is performed to determine a block of output pixels.

FIG. 7 is a flow chart for the method performed by the processing module 304 in the first example. The flow chart in FIG. 7 has the same steps as the flow chart shown in FIG. 4, including steps S402, S404, S406, S408, S410 and S412 as described above. However, FIG. 7 shows some extra detail about how steps S406, S408 and S410 are implemented in this example, as described below.

The method starts with step S402 as described above in which the block of input pixels 602 is received at the processing module 304. The block of input pixels 602 is a 4×4 block of input pixels. The block of input pixels 602 is passed to the upsampling logic 308. In step S404 the upsampling logic 308 determines a block of upsampled pixels 604 based on the block of input pixels 602. As described above, the upsampling logic 308 could determine the block of upsampled pixels 604 according to any suitable technique, such as by performing bilinear upsampling on the block of input pixels 602. In the embodiment of the first example shown in FIG. 6*a*, the block of upsampled pixels is a 6×6 block of upsampled pixels. The block of upsampled pixels is passed to, and received by, the output pixel determination logic 310. FIG. 6*b* shows one possibility for the relative alignment of the block of input pixels 602, the block of upsampled pixels 604 and the block of output pixels 616. In FIG. 6*b*, the input pixels of the 4×4 block of input pixels 602 are shown as unfilled circles with bold edges, the output pixels of the 2×2 block of output pixels 616 are shown with solid circles, and the upsampled pixels of the 6×6 block of upsampled pixels 604 are shown as unfilled circles with non-bold edges. The block of input pixels 602 and the block of upsampled pixels 604 are aligned so that, apart from the bottom row and rightmost column of input pixels from the block of input pixels, each of the input pixels overlaps with one of the upsampled pixels, and there is an upsampled pixel halfway between each pair of adjacent input pixels in horizontal and vertical directions. The block of output pixels 616 is aligned and overlapping with the central 2×2 portion of the upsampled pixels of the block of upsampled pixels 604.

In this example, step S406 of determining one or more range kernels comprises step S702 in which a plurality of range kernels are determined. In particular, in step S702, the output pixel determination logic 310 determines, for each of a plurality of partially overlapping sub-blocks of upsampled pixels 606 within the block of upsampled pixels 604, a respective range kernel 608 based on the upsampled pixels of that sub-block of upsampled pixels 606. In particular, as shown in FIG. 6*a*, there are four partially overlapping sub-blocks of upsampled pixels. The first sub-block $606_1$ includes all of the upsampled pixels from the block of upsampled pixels 604 except for the upsampled pixels in the rightmost column and the upsampled pixels in the bottom row of the block of upsampled pixels 604 (such that the first sub-block $606_1$ is centred on the top left output pixel in the block of output pixels 616, as can be understood with reference to FIG. 6*b*). A first range kernel $608_1$ is determined in step S702 based on the upsampled pixels within the first sub-block of upsampled pixels $606_1$. The second sub-block $606_2$ includes all of the upsampled pixels from the block of upsampled pixels 604 except for the upsampled pixels in the leftmost column and the upsampled pixels in the bottom row of the block of upsampled pixels 604 (such that the second sub-block $606_2$ is centred on the top right output pixel in the block of output pixels 616, as can be understood with reference to FIG. 6*b*). A second range kernel $608_2$ is determined in step S702 based on the upsampled pixels within the second sub-block of upsampled pixels $606_2$. The third sub-block $606_3$ includes all of the upsampled pixels from the block of upsampled pixels 604 except for the upsampled pixels in the rightmost column and the upsampled pixels in the top row of the block of upsampled pixels 604 (such that the third sub-block $606_3$ is centred on the bottom left output pixel in the block of output pixels 616, as can be understood with reference to FIG. 6*b*). A third range kernel $608_3$ is determined in step S702 based on the upsampled pixels within the third sub-block of upsampled pixels $606_3$. The fourth sub-block $606_4$ includes all of the upsampled pixels from the block of upsampled pixels 604 except for the upsampled pixels in the leftmost column and the upsampled pixels in the top row of the block of upsampled pixels 604 (such that the fourth sub-block $606_4$ is centred on the bottom right output pixel in the block of output pixels 616, as can be understood with reference to FIG. 6*b*). A fourth range kernel $608_4$ is determined in step S702 based on the upsampled pixels within the fourth sub-block of upsampled pixels $606_4$. In this example, the partially overlapping sub-blocks 606 are 5×5 sub-blocks and the range kernels 608 are 5×5 range kernels.

In this example, step S408 of combining the range kernels with a sharpening kernel comprises step S704. In step S704 the output pixel determination logic 310 combines the range kernel for each sub-block with a sharpening kernel to determine a bilateral sharpening kernel for each sub-block. The sharpening kernel is not shown in FIG. 6*a*. In particular, the first range kernel $608_1$ is combined with the sharpening kernel to determine a first bilateral sharpening kernel $610_1$; the second range kernel $608_2$ is combined with the sharpening kernel to determine a second bilateral sharpening kernel $610_2$; the third range kernel $608_3$ is combined with the sharpening kernel to determine a third bilateral sharpening kernel $610_3$; and the fourth range kernel $608_4$ is combined with the sharpening kernel to determine a fourth bilateral sharpening kernel $610_4$. As described above, the range kernels 608 are combined with the sharpening kernel by performing elementwise multiplication to determine the respective bilateral sharpening kernels 610. The same sharpening kernel is used to determine each of the bilateral sharpening kernels 610. As described above, the sharpening kernel may be an unsharp mask kernel. In the example shown in FIG. 6*a*, the sharpening kernel and all of the bilateral sharpening kernels 610 are 5×5 kernels.

In this example, step S410 of using the one or more bilateral sharpening kernels to determine the output pixels of the block of output pixels comprises step S706. In step S706 the output pixel determination logic 310 determines each of the output pixels of the block of output pixels 616 by applying to a respective one of the plurality of partially overlapping sub-blocks of upsampled pixels 606, the respective bilateral sharpening kernel that was determined by combining the respective range kernel 608 determined for that sub-block of upsampled pixels 606 with the sharpening kernel. As shown in FIG. 6*a*, the bilateral sharpening kernels 610 may each be normalised (thereby determining the normalised bilateral sharpening kernels 612) before they are applied to the respective sub-blocks 606. In particular, the first bilateral sharpening kernel $610_1$ can be normalised to determine a first normalised bilateral sharpening kernel $612_1$ which can then be applied to the first sub-block of upsampled pixels $606_1$ to determine the first output pixel (e.g. the top left output pixel) of the block of output pixels 616. The second bilateral sharpening kernel $610_2$ can be normalised to determine a second normalised bilateral sharpening kernel $612_2$ which can then be applied to the second sub-block of upsampled pixels $606_2$ to determine the second output pixel (e.g. the top right output pixel) of the block of output pixels 616. The third bilateral sharpening kernel $610_3$ can be normalised to determine a third normalised bilateral sharpening kernel $612_3$ which can then be applied to the third sub-block of upsampled pixels $606_3$ to determine the third output pixel (e.g. the bottom left output pixel) of the block of output pixels 616. The fourth bilateral sharpening kernel $610_4$ can be normalised to determine a fourth normalised bilateral sharpening kernel $612_4$ which can then be applied to the fourth sub-block of upsampled pixels $606_4$ to determine the fourth output pixel (e.g. the bottom right output pixel) of the block of output pixels 616. Applying a kernel to a sub-block of upsampled pixels means performing a dot product of the sub-block with the kernel, i.e. performing a weighted sum of the upsampled pixels in the sub-block wherein the weights of the weighted sum are given by the corresponding values in the kernel. Therefore the result of applying a kernel to a sub-block of upsampled pixels is a single output value which is used as the respective output pixel. The kernels are applied to the sub-blocks of upsampled pixels using kernel application logic 614.

In some examples, the bilateral sharpening kernels 610 may be determined in such a way in step S704 that they are normalised, such that a separate step of normalising the bilateral sharpening kernels is not necessary.

As described above, in step S412 the block of output pixels 616 is output from the output pixel determination logic 310, and output from the processing module 304. The method can then be repeated for the next block of input pixels by striding across the input image with a stride of 1, and by striding the output by 2 such that a 2× upsampling is achieved. After the block of output pixels 616 has been output from the processing module 304 it may be used in any suitable manner, e.g. it may be stored in a memory, displayed on a display or transmitted to another device. It will be appreciated that the same principle may be applied to achieve other upsampling factors such as 3× and 4×, and that the example implementation described with respect to FIGS.

6*a*, 6*b* and 7 may be adapted accordingly, as would be apparent to one skilled in the art.

So, in the first example shown in FIGS. 6*a*, 6*b* and 7, the method involves performing the following steps for each of a plurality of partially overlapping sub-blocks of upsampled pixels $\mathbf{606}_i$, within the block of upsampled pixels 604 (for i=1,2,3,4):

- determining a range kernel $\mathbf{608}_i$ based on the upsampled pixels of the sub-block of upsampled pixels $\mathbf{606}_i$;
- combining the range kernel $\mathbf{608}_i$ with a sharpening kernel to determine a bilateral sharpening kernel $\mathbf{610}_i$; and
- determining one of the output pixels of the block of output pixels 616 by applying the bilateral sharpening kernel $\mathbf{610}_i$ (or $\mathbf{612}_i$ if the bilateral sharpening kernel is normalised first) to the sub-block of upsampled pixels $\mathbf{606}_i$.

Figure 8B:
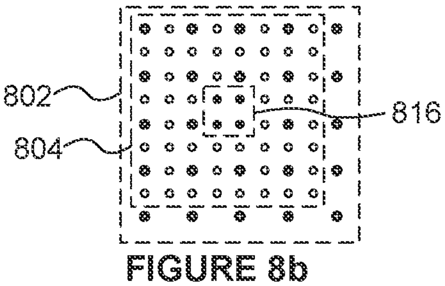
FIG. 8*b* illustrates how the block of output pixels determined by the processing module in FIG. 8*a* relates to the block of input pixels.
Figure 8A:
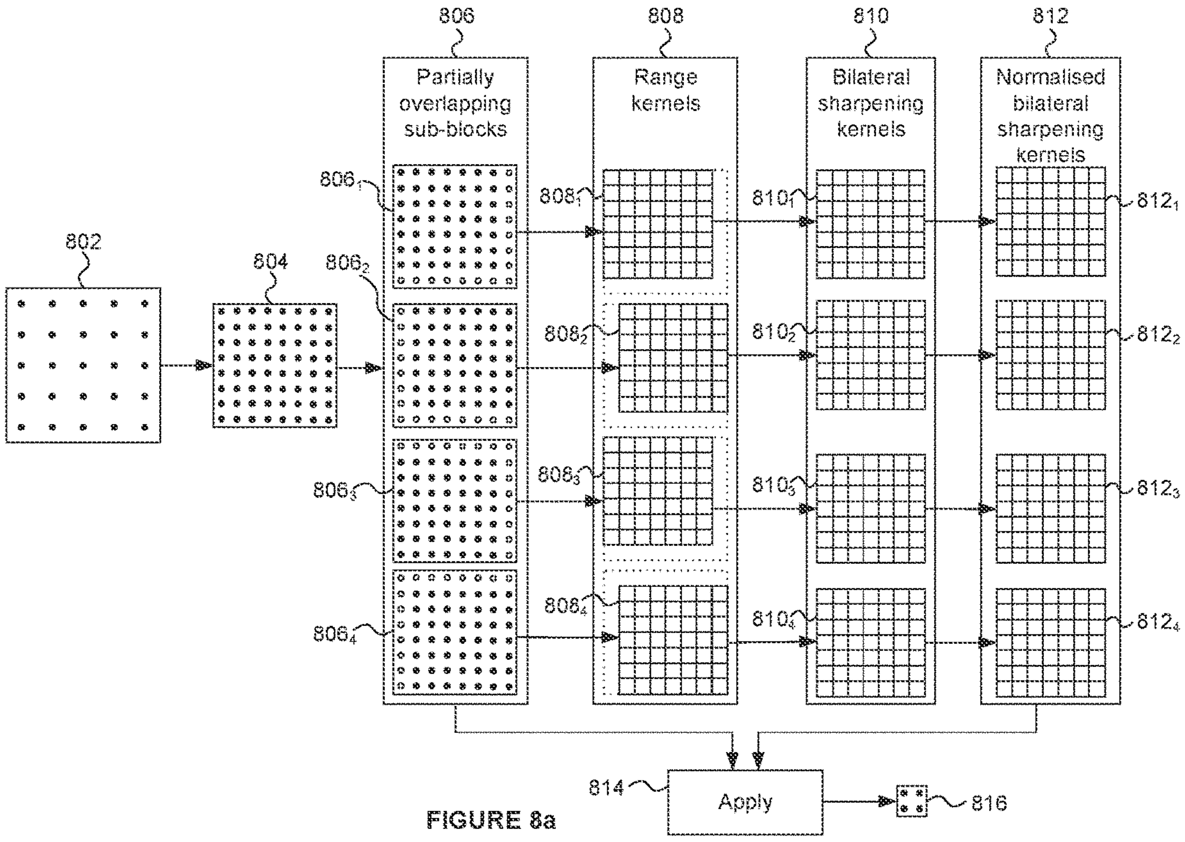
FIG. 8*a* illustrates a method performed by the processing module in a second embodiment of the first example of applying adaptive sharpening for a block of input pixels for which upsampling is performed to determine a block of output pixels.

A second embodiment of the first example implementation is described with reference to FIGS. 8*a*, 8*b* and 7. The second embodiment of the first example is the same as the first embodiment of the first example shown in FIG. 6*a* except for the sizes of the block of input pixels, the block of upsampled pixels, the sub-blocks and the kernels. The method of the second embodiment of the first example has the same steps shown in FIG. 7 as described above. FIG. 8*a* illustrates the method performed by the processing module 304 in the second embodiment of the first example, and FIG. 8*b* illustrates how the block of output pixels 816 determined by the processing module 304 in FIG. 8*a* relates to the block of input pixels 802 and to the block of upsampled pixels 804.

In the second embodiment of the first example, the method starts with step S402 as described above in which the block of input pixels 802 is received at the processing module 304. In the example shown in FIG. 8*a*, the block of input pixels 802 is a 5×5 block of input pixels. In step S404 the upsampling logic 308 determines a block of upsampled pixels 804 based on the block of input pixels 802, e.g. by performing bilinear upsampling on the block of input pixels 802. The block of upsampled pixels 804 is an 8×8 block of upsampled pixels. FIG. 8*b* shows one possibility for the relative alignment of the block of input pixels 802, the block of upsampled pixels 804 and the block of output pixels 816 in this second embodiment of the first example implementation. In FIG. 8*b*, the input pixels of the 5×5 block of input pixels 802 are shown as unfilled circles with bold edges, the output pixels of the 2×2 block of output pixels 816 are shown with solid circles, and the upsampled pixels of the 8×8 block of upsampled pixels 604 are shown as unfilled circles with non-bold edges. The block of input pixels 802 and the block of upsampled pixels 804 are aligned so that, apart from the bottom row and rightmost column of input pixels from the block of input pixels, each of the input pixels overlaps with one of the upsampled pixels, and there is an upsampled pixel halfway between each pair of adjacent input pixels in horizontal and vertical directions. The block of output pixels 816 is aligned and overlapping with the central 2×2 portion of the upsampled pixels of the block of upsampled pixels 804.

The partially overlapping sub-blocks ($\mathbf{806}_1$, $\mathbf{806}_2$, $\mathbf{806}_3$ and $\mathbf{806}_4$) are 7×7 sub-blocks of upsampled pixels. In step S406 (i.e. step S702) the output pixel determination logic 310 determines a respective range kernel ($\mathbf{808}_1$, $\mathbf{808}_2$, $\mathbf{808}_3$ and $\mathbf{808}_4$) for each of the partially overlapping sub-blocks of upsampled pixels ($\mathbf{806}_1$, $\mathbf{806}_2$, $\mathbf{806}_3$ and $\mathbf{806}_4$). In the example shown in FIG. 8*a*, each of the range kernels ($\mathbf{808}_1$, $\mathbf{808}_2$, $\mathbf{808}_3$ and $\mathbf{808}_4$) is a 7×7 range kernel.

In step S408 (i.e. step S704) the output pixel determination logic 310 combines each of the range kernels ($\mathbf{808}_1$, $\mathbf{808}_2$, $\mathbf{808}_3$ and $\mathbf{808}_4$) with a sharpening kernel to determine a respective bilateral sharpening kernel ($\mathbf{810}_1$, $\mathbf{810}_2$, $\mathbf{810}_3$ and $\mathbf{810}_4$). The bilateral sharpening kernels ($\mathbf{810}_1$, $\mathbf{810}_2$, $\mathbf{810}_3$ and $\mathbf{810}_4$) can each be normalised to determine the normalised bilateral sharpening kernels ($\mathbf{812}_1$, $\mathbf{812}_2$, $\mathbf{812}_3$ and $\mathbf{812}_4$). In the example shown in FIG. 8*a*, the sharpening kernel, all of the bilateral sharpening kernels ($\mathbf{810}_1$, $\mathbf{810}_2$, $\mathbf{810}_3$ and $\mathbf{810}_4$) and all of the normalised bilateral sharpening kernels ($\mathbf{812}_1$, $\mathbf{812}_2$, $\mathbf{812}_3$ and $\mathbf{812}_4$) are 7×7 kernels. In some examples, the bilateral sharpening kernels 810 may be determined in such a way in step S704 that they are normalised, such that a separate step of normalising the bilateral sharpening kernels is not necessary.

In step S410 (i.e. step S706) the output pixel determination logic 310 determines each of the output pixels of the block of output pixels 816 by applying the bilateral sharpening kernels (or the normalised bilateral sharpening kernels ($\mathbf{812}_1$, $\mathbf{812}_2$, $\mathbf{812}_3$ and $\mathbf{812}_4$)) to the respective sub-blocks of upsampled pixels ($\mathbf{806}_1$, $\mathbf{806}_2$, $\mathbf{806}_3$ and $\mathbf{806}_4$).

In step S412 the block of output pixels 816 is output from the output pixel determination logic 310, and output from the processing module 304. The method can then be repeated for the next block of input pixels by striding across the input image with a stride of 1, and by striding the output by 2 such that a 2× upsampling is achieved. After the block of output pixels 816 has been output from the processing module 304 it may be used in any suitable manner, e.g. it may be stored in a memory, displayed on a display or transmitted to another device. It will be appreciated that the same principle may be applied to achieve other upsampling factors such as 3× and 4×, and that the example implementation described with respect to FIGS. 8*a*, 8*b* and 7 may be adapted accordingly, as would be apparent to one skilled in the art.

In general, in the first example (shown in the embodiments of FIGS. 6*a* to 8*b*), the block of input pixels is an m×m block of input pixels, the block of upsampled pixels is an n×n block of upsampled pixels wherein n>m, each of the sub-blocks of upsampled pixels is a p×p sub-block of upsampled pixels wherein p may be odd, each of the range kernels is a p×p range kernel, the sharpening kernel is a p×p sharpening kernel, each of the bilateral sharpening kernels is a p×p bilateral sharpening kernel, and the block of output pixels is a q×q block of output pixels (where q is the upsampling factor). In the embodiments shown in FIGS. 6*a* and 8*a* n=p+1, such that each of the partially overlapping sub-blocks of upsampled pixels include all of the upsampled pixels from the block of upsampled pixels except for one row and one column of upsampled pixels. In general, for a given upsampling factor q, n=p+q−1. In the first embodiment of the first example, shown in FIG. 6*a*, m=4, n=6, p=5 and q=2. In the second embodiment of the first example, shown in FIG. 8*a*, m=4, n=8, p=7 and q=2. In some examples, the upsampling factor may be 1, and the block of upsampled pixels may be the same as the block of input pixels. This would be useful for sharpening an image without increasing its resolution. Where the upsampling factor is 1, the upsampling logic may pass through the input block without changing it.

Figure 9A:
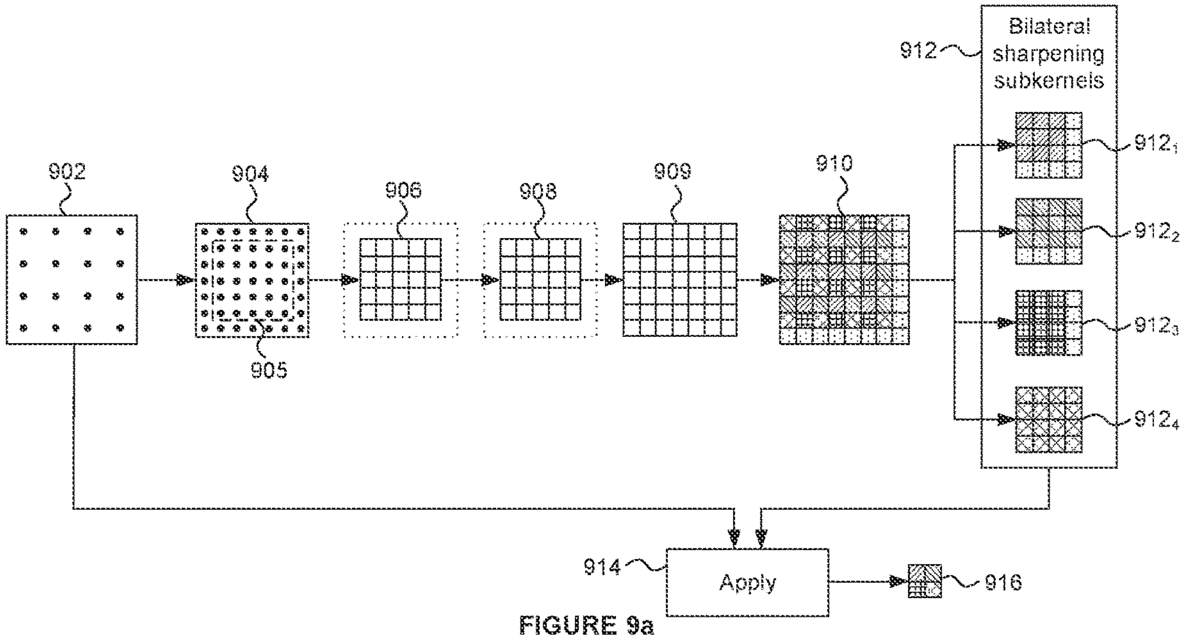
FIG. 9*a* illustrates a method performed by the processing module in a second example of applying adaptive sharpening for a block of input pixels for which upsampling is performed to determine a block of output pixels.
Figure 9B:
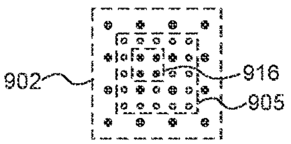
FIG. 9*b* illustrates how the block of output pixels determined by the processing module in FIG. 9*a* relates to the block of input pixels.

A second example implementation is described with reference to FIGS. 9*a*, 9*b*, 10 and 11. FIG. 9*a* illustrates a method performed by the processing module 304 of applying adaptive sharpening for a block of input pixels 902 for which upsampling is performed to determine a block of output pixels 916, e.g. for implementing a super resolution technique. FIG. 9*b* illustrates how the block of output pixels 916 determined by the processing module 304 in FIG. 9*a* relates to the block of input pixels 902 and to the central 5×5 region 905 of the block of upsampled pixels 904.

Figure 10:
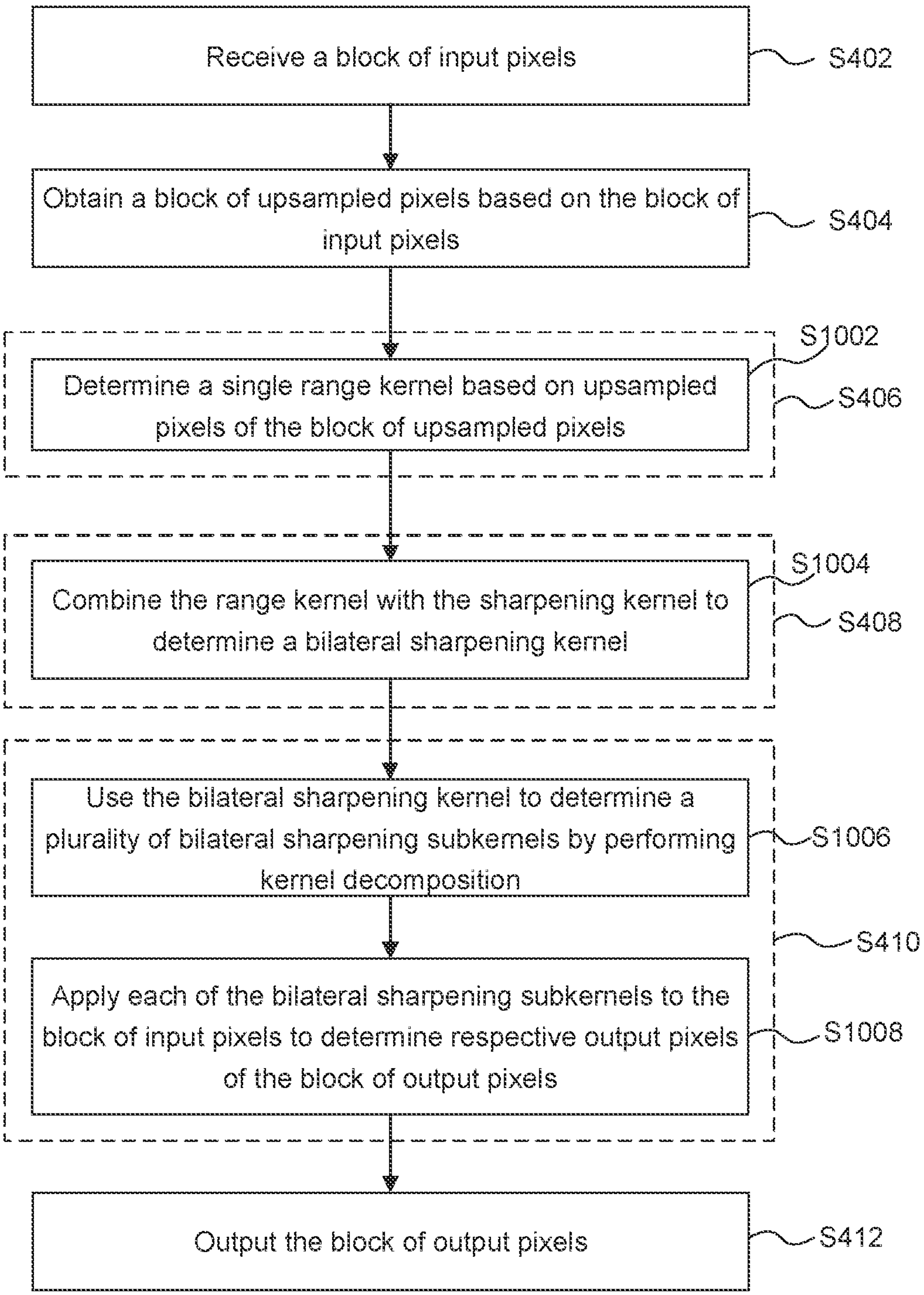
FIG. 10 is a flow chart for the method performed by the processing module in the second example of applying adaptive sharpening for a block of input pixels for which upsampling is performed to determine a block of output pixels.

FIG. 10 is a flow chart for the method performed by the processing module 304 in the second example. The flow chart in FIG. 10 has the same steps as the flow chart shown in FIG. 4, including steps S402, S404, S406, S408, S410 and S412 as described above. However, FIG. 10 shows some extra detail about how steps S406, S408 and S410 are implemented in this example, as described below.

The method starts with step S402 as described above in which the block of input pixels 902 is received at the processing module 304. The block of input pixels 902 is a 4×4 block of input pixels. The block of input pixels 902 is passed to the upsampling logic 308. In step S404 the upsampling logic 308 determines a block of upsampled pixels 904 based on the block of input pixels 902. As described above, the upsampling logic 308 could determine the block of upsampled pixels 904 according to any suitable technique, such as by performing bilinear upsampling on the block of input pixels 902. In the example shown in FIG. 9*a*, the block of upsampled pixels 904 is a 7×7 block of upsampled pixels, and the central 5×5 region of the block of upsampled pixels 904 is indicated with the dashed box 905 in FIG. 9*a*. The block of upsampled pixels is passed to, and received by, the output pixel determination logic 310. FIG. 9*b* shows one possibility for the relative alignment of the block of input pixels 902, the central 5×5 region of the block of upsampled pixels 905 and the block of output pixels 916 in this second example implementation. In FIG. 9*b*, the input pixels of the 4×4 block of input pixels 902 are shown as unfilled circles with bold edges, the output pixels of the 2×2 block of output pixels 916 are shown with solid circles, and the upsampled pixels of the 5×5 region 905 are shown as unfilled circles with non-bold edges. The block of input pixels 902 and the block of upsampled pixels 904 are aligned so that, apart from the bottom row and rightmost column of input pixels from the block of input pixels, each of the input pixels overlaps with one of the upsampled pixels, and there is an upsampled pixel halfway between each pair of adjacent input pixels in horizontal and vertical directions. The output pixels have the same resolution as the upsampled pixels, and the bottom right output pixel of the block of output pixels 916 is aligned with the centre of the block of upsampled pixels 904.

In this example, step S406 of determining one or more range kernels comprises step S1002 in which a single range kernel is determined. In particular, in step S1002, the output pixel determination logic 310 determines a single range kernel 906 based on upsampled pixels of the block of upsampled pixels 904. In particular, the range kernel 906 is based on the central 5×5 upsampled pixels in the block of upsampled pixels 904, which are indicated by the dashed box 905 in FIG. 9*a*. As such, the range kernel 906 is a 5×5 range kernel in this example.

In this example, step S408 of combining the range kernel with a sharpening kernel comprises step S1004. In step S1004 the output pixel determination logic 310 combines the single range kernel 906 with the sharpening kernel to determine a single bilateral sharpening kernel 908. In this example, the sharpening kernel and the bilateral sharpening kernel 908 are 5×5 kernels.

Figure 11:
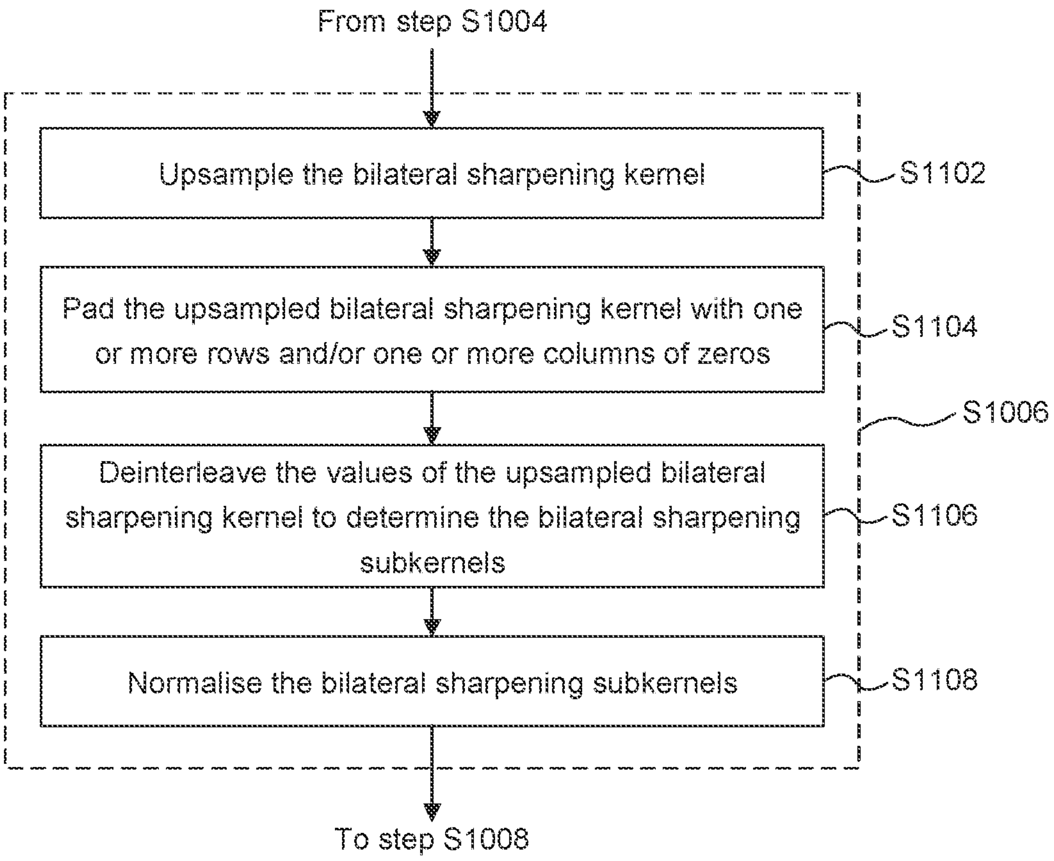
FIG. 11 is a flow chart showing an example of how to implement step S1006 of the method shown in FIG. 10.

In this example, step S410 of using the bilateral sharpening kernel 908 to determine the output pixels of the block of output pixels 916 comprises steps S1006 and S1008. In step S1006 the output pixel determination logic 310 uses the bilateral sharpening kernel 908 to determine a plurality of bilateral sharpening subkernels 912 by performing kernel decomposition. FIG. 11 shows an implementation of step S1006, which corresponds to what is illustrated in FIG. 9*a*. In this implementation, step S1006 comprises steps S1102, S1104, S1106 and S1108.

In step S1102 the output pixel determination logic 310 (or the upsampling logic 308) upsamples the bilateral sharpening kernel 908 to determine an upsampled bilateral sharpening kernel 909. The upsampling of the bilateral sharpening kernel 908 could be performed according to any suitable technique, such as by performing bilinear upsampling. Techniques for performing upsampling, such as bilinear upsampling are known to those skilled in the art. For example, bilinear upsampling may be performed by performing a convolution operation on the bilateral sharpening kernel 908 using a bilinear kernel (e.g. a 3×3 bilinear kernel of the form $$\begin{bmatrix} 0.25 & 0.5 & 0.25 \\ 0.5 & 1 & 0.5 \\ 0.25 & 0.25 & 0.25 \end{bmatrix}\Bigg).$$

In the embodiment of the second example shown in FIG. 9*a*, the bilateral sharpening kernel 908 is a 5×5 kernel and the upsampled bilateral sharpening kernel 909 is a 7×7 kernel.

In step S1104 the output pixel determination logic 310 pads the upsampled bilateral sharpening kernel with one or more rows and/or one or more columns of zeros. The result of the padding is an 8×8 upsampled bilateral sharpening kernel 910 in the example shown in FIG. 9*a*. The rightmost column and the bottom row of the kernel 910 (which are shown as dotted boxes in FIG. 9*a*) have been added by the padding and they contain only zeros.

In step S1106 the output pixel determination logic 310 deinterleaves the values of the (padded) upsampled bilateral sharpening kernel 910 to determine the plurality of bilateral sharpening subkernels $912_1$, $912_2$, $912_3$ and $912_4$. The different types of hatching in FIG. 9*a* indicate which values of the (padded) upsampled bilateral sharpening kernel 910 go into which of the bilateral sharpening subkernels 912. In particular, if we consider the rows and columns of the kernel 910 to be numbered from 1 to 8 then the deinterleaving of step S1108: (i) puts the values which are in even-numbered rows and even-numbered columns of the kernel 910 (which are shown with diagonal hatching sloping upwards to the right in FIG. 9*a*) into the first bilateral sharpening subkernel $912_1$; (ii) puts the values which are in even-numbered rows and odd-numbered columns of the kernel 910 (which are shown with diagonal hatching sloping downwards to the right in FIG. 9*a*) into the second bilateral sharpening subkernel $912_2$; (iii) puts the values which are in odd-numbered rows and even-numbered columns of the kernel 910 (which are shown with vertical and horizontal square hatching in FIG. 9*a*) into the third bilateral sharpening subkernel $912_3$; and (iv) puts the values which are in odd-numbered rows and odd-numbered columns of the kernel 910 (which are shown with diagonal square hatching in FIG. 9*a*) into the fourth bilateral sharpening subkernel $912_4$. In this way, the first bilateral sharpening subkernel $912_1$ has padded values (i.e. zeros) in its rightmost column and in its bottom row, the second bilateral sharpening subkernel $912_2$ has padded values (i.e. zeros) in its bottom row, the third bilateral sharpening subkernel $912_3$ has padded values (i.e. zeros) in its rightmost column, and the fourth bilateral sharpening subkernel $912_4$ does not have any padded values. In this example, each of the bilateral sharpening subkernels is a 4×4 subkernel.

In step S1108 the output pixel determination logic 310 normalises the bilateral sharpening subkernels $\mathbf{912}_1$, $\mathbf{912}_2$, $\mathbf{912}_3$ and $\mathbf{912}_4$. As described above, the normalisation of a bilateral sharpening subkernel can be performed by summing all of the values in the bilateral sharpening subkernel and then dividing each of the values by the result of the sum to determine the values of the normalised bilateral sharpening subkernel. In some examples, the bilateral sharpening subkernels $\mathbf{912}_1$, $\mathbf{912}_2$, $\mathbf{912}_3$ and $\mathbf{912}_4$ may be determined in such a way that they are normalised, such that a separate step of normalising the bilateral sharpening subkernels (i.e. step S1108) is not necessary.

In step S1008 the output pixel determination logic 310 applies each of the bilateral sharpening subkernels ($\mathbf{912}_1$, $\mathbf{912}_2$, $\mathbf{912}_3$ and $\mathbf{912}_4$) to the block of input pixels 902 to determine respective output pixels of the block of output pixels 916. In particular, the first bilateral sharpening subkernel $\mathbf{912}_1$ is applied to the block of input pixels 902 to determine the first output pixel (e.g. the top left output pixel, which is shown with diagonal hatching sloping upwards to the right in FIG. 9*a*) of the block of output pixels 916. The second bilateral sharpening subkernel $\mathbf{912}_2$ is applied to the block of input pixels 902 to determine the second output pixel (e.g. the top right output pixel, which is shown with diagonal hatching sloping downwards to the right in FIG. 9*a*) of the block of output pixels 916. The third bilateral sharpening subkernel $\mathbf{912}_3$ is applied to the block of input pixels 902 to determine the third output pixel (e.g. the bottom left output pixel, which is shown with vertical and horizontal square hatching in FIG. 9*a*) of the block of output pixels 916. The fourth bilateral sharpening subkernel $\mathbf{912}_4$ is applied to the block of input pixels 902 to determine the fourth output pixel (e.g. the bottom right output pixel, which is shown with diagonal square hatching in FIG. 9*a*) of the block of output pixels 916.

In some implementations steps S1106 and S1108 may be combined into a single step, so that instead of padding the upsampled bilateral sharpening kernel and then deinterleaving the values of the padded kernel, the method may just split the 7×7 kernel into a 4×4 kernel, a 4×3 kernel, a 3×4 kernel and a 3×3 kernel which can then each be applied to the block of input pixels.

In step S412 the block of output pixels 916 is output from the output pixel determination logic 310, and output from the processing module 304. The method can then be repeated for the next block of input pixels by striding across the input image with a stride of 1, and by striding the output by 2 such that a 2× upsampling is achieved. After the block of output pixels 916 has been output from the processing module 304 it may be used in any suitable manner, e.g. it may be stored in a memory, displayed on a display or transmitted to another device.

In general, in the second example (shown in the embodiments of FIGS. 9*a* to 11), the block of input pixels 902 is an m×m block of input pixels, the block of upsampled pixels 904 is an n×n block of upsampled pixels wherein n>m, the range kernel 906 is a p×p range kernel wherein p may be odd, the sharpening kernel is a p×p sharpening kernel, the bilateral sharpening kernel is a p×p bilateral sharpening kernel, the upsampled bilateral sharpening kernel 909 is u×u upsampled bilateral sharpening kernel, the padded upsampled bilateral sharpening kernel 910 is a t×t padded upsampled bilateral sharpening kernel, each of the bilateral sharpening subkernels ($\mathbf{912}_1$, $\mathbf{912}_2$, $\mathbf{912}_3$ and $\mathbf{912}_4$) is a m×m bilateral sharpening subkernel, and the block of output pixels is a q×q block of output pixels. The number of bilateral sharpening subkernels 912 is v. In the examples described herein the padding is performed so that t mod v=0, which means that the padded upsampled bilateral sharpening kernel 910 can be decomposed into v subkernels 912 of equal size. In the implementation of the second example shown in FIG. 9*a*, m=4, q=2, n=7, p=5, u=7, t=8 and v=4. It is noted that t=qm because there are as many subkernels horizontally and vertically as the size of the stride, and each of the subkernels is applied to the same input patch of size m. Furthermore, $v=q^2$ because there is a respective bilateral sharpening subkernel for each of the output pixels.

Figure 12:
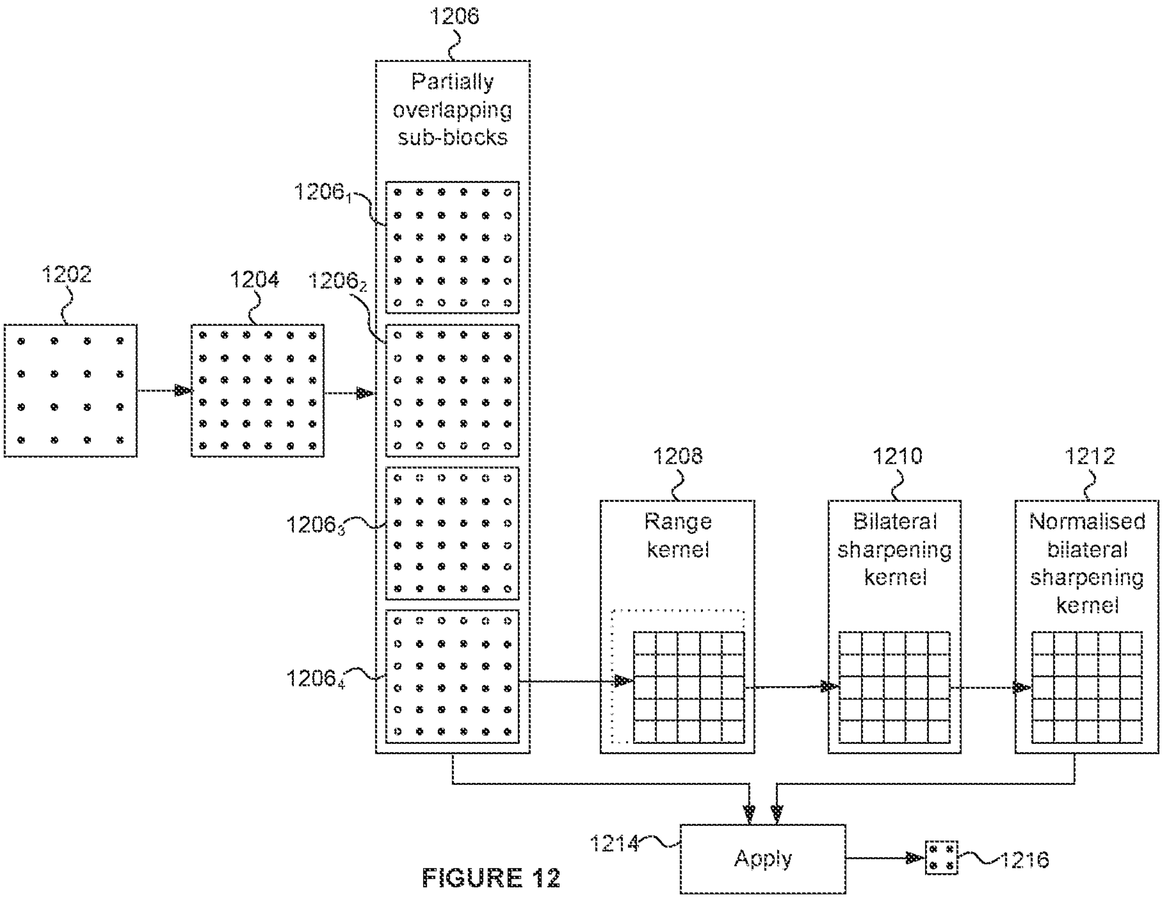
FIG. 12 illustrates a method performed by the processing module in a third example of applying adaptive sharpening for a block of input pixels for which upsampling is performed to determine a block of output pixels.

A third example implementation is described with reference to FIGS. 12 and 13. FIG. 12 illustrates a method performed by the processing module 304 of applying adaptive sharpening for a block of input pixels 1202 for which upsampling is performed to determine a block of output pixels 1216, e.g. for implementing a super resolution technique. The block of output pixels 1216 determined by the processing module 304 in FIG. 12 relates to the block of input pixels 1202 and to the block of upsampled pixels 1204 in the same way that the block of output pixels 616 relates to the block of input pixels 602 and the block of upsampled pixels 604 as shown in FIG. 6*b*.

Figure 13:
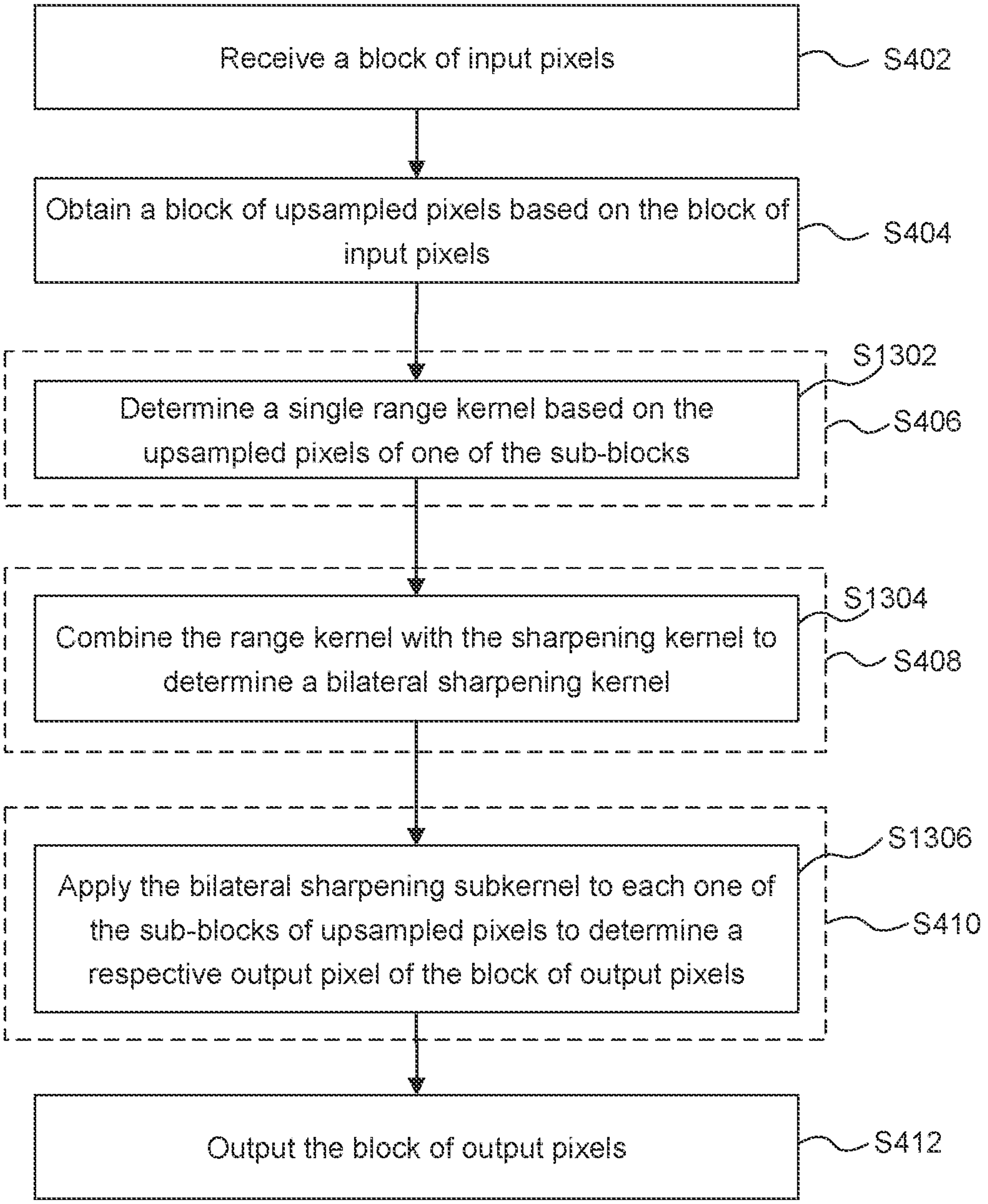
FIG. 13 is a flow chart for the method performed by the processing module in the third example of applying adaptive sharpening for a block of input pixels for which upsampling is performed to determine a block of output pixels.

FIG. 13 is a flow chart for the method performed by the processing module 304 in the third example. The flow chart in FIG. 13 has the same steps as the flow chart shown in FIG. 4, including steps S402, S404, S406, S408, S410 and S412 as described above. However, FIG. 13 shows some extra detail about how steps S406, S408 and S410 are implemented in this example, as described below.

The method starts with step S402 as described above in which the block of input pixels 1202 is received at the processing module 304. The block of input pixels 1202 is a 4×4 block of input pixels. The block of input pixels 1202 is passed to the upsampling logic 308. In step S404 the upsampling logic 308 determines a block of upsampled pixels 1204 based on the block of input pixels 1202. As described above, the upsampling logic 308 could determine the block of upsampled pixels 1204 according to any suitable technique, such as by performing bilinear upsampling on the block of input pixels 1202. In the third example shown in FIG. 12, the block of upsampled pixels 1204 is a 6×6 block of upsampled pixels. The block of upsampled pixels is passed to, and received by, the output pixel determination logic 310.

A plurality of partially overlapping sub-blocks of upsampled pixels 1206 within the block of upsampled pixels 1204 are identified. As shown in FIG. 12, there are four partially overlapping sub-blocks of upsampled pixels. The first sub-block $\mathbf{1206}_1$ includes all of the upsampled pixels from the block of upsampled pixels 1204 except for the upsampled pixels in the rightmost column and the upsampled pixels in the bottom row of the block of upsampled pixels 1204. The second sub-block $\mathbf{1206}_2$ includes all of the upsampled pixels from the block of upsampled pixels 1204 except for the upsampled pixels in the leftmost column and the upsampled pixels in the bottom row of the block of upsampled pixels 1204. The third sub-block $\mathbf{1206}_3$ includes all of the upsampled pixels from the block of upsampled pixels 1204 except for the upsampled pixels in the rightmost column and the upsampled pixels in the top row of the block of upsampled pixels 1204. The fourth sub-block $\mathbf{1206}_4$ includes all of the upsampled pixels from the block of upsampled pixels 1204 except for the upsampled pixels in the leftmost column and the upsampled pixels in the top row of the block of upsampled pixels 1204. In this example, the partially overlapping sub-blocks 1206 are 5×5 sub-blocks.

In this example, step S406 of determining one or more range kernels comprises step S1302 in which a single range kernel is determined. In particular, in step S1302, the output pixel determination logic 310 determines a single range kernel 1208 based on the upsampled pixels of one of the sub-blocks of upsampled pixels 1206. In the example shown in FIG. 12 the range kernel 1208 is determined based on the upsampled pixels of the fourth sub-block $\mathbf{1206_4}$, but in other examples, the range kernel could be determined based on the upsampled pixels of one of the other sub-blocks ($\mathbf{1206_1}$, $\mathbf{1206_2}$ or $\mathbf{1206_3}$). As such, the range kernel 1208 is a 5×5 range kernel in this example.

In this example, step S408 of combining the range kernel with a sharpening kernel comprises step S1304. In step S1304 the output pixel determination logic 310 combines the single range kernel 1208 with the sharpening kernel to determine a single bilateral sharpening kernel 1210. In this example, the sharpening kernel and the bilateral sharpening kernel 1210 are 5×5 kernels.

In this example, step S410 of using the bilateral sharpening kernel 1210 to determine the output pixels of the block of output pixels 1216 comprises step S1306. In step S1306 the output pixel determination logic 310 determines each of the output pixels of the block of output pixels 1216 by applying 1214 the bilateral sharpening kernel to a respective one of the plurality of partially overlapping sub-blocks of upsampled pixels 1206. As shown in FIG. 12, the bilateral sharpening kernel 1210 may be normalised (thereby determining the normalised bilateral sharpening kernel 1212) before it is applied 1214 to the sub-blocks 1206. In particular, the normalised bilateral sharpening kernel 1212 can be applied to the first sub-block of upsampled pixels $\mathbf{1206_1}$ to determine the first output pixel (e.g. the top left output pixel) of the block of output pixels 1216. The normalised bilateral sharpening kernel 1212 can be applied to the second sub-block of upsampled pixels $\mathbf{1206_2}$ to determine the second output pixel (e.g. the top right output pixel) of the block of output pixels 1216. The normalised bilateral sharpening kernel 1212 can be applied to the third sub-block of upsampled pixels $\mathbf{1206_3}$ to determine the third output pixel (e.g. the bottom left output pixel) of the block of output pixels 1216. The normalised bilateral sharpening kernel 1212 can be applied to the fourth sub-block of upsampled pixels $\mathbf{1206_4}$ to determine the fourth output pixel (e.g. the bottom right output pixel) of the block of output pixels 1216. In some examples, the bilateral sharpening kernel 1210 may be determined in such a way in step S1304 that it is normalised, such that a separate step of normalising the bilateral sharpening kernel is not necessary.

In step S412 the block of output pixels 1216 is output from the output pixel determination logic 310, and output from the processing module 304. The method can then be repeated for the next block of input pixels by striding across the input image with a stride of 1, and by striding the output by 2 such that a 2× upsampling is achieved. After the block of output pixels 1216 has been output from the processing module 304 it may be used in any suitable manner, e.g. it may be stored in a memory, displayed on a display or transmitted to another device.

The bilateral filtering techniques described herein reduce overshoot near edges. Furthermore, the bilateral filtering techniques described herein can maintain sharpening in low contrast regions.

The first example (shown in FIG. 6*a* or 8*a*) may provide higher quality results (in terms of avoiding blurring artefacts than the second and third examples (shown in FIGS. 9*a* and 12) because each output pixel is determined using its own range kernel. However, the second and third examples may be simpler to implement than the first example, leading to benefits in terms of reduced latency, power consumption and/or silicon area. The quality of the results provided by the second and third examples are similar to each other, but the third example may be considered to be preferable to the second example because it is cheaper and easier to implement in hardware.

Figure 14:
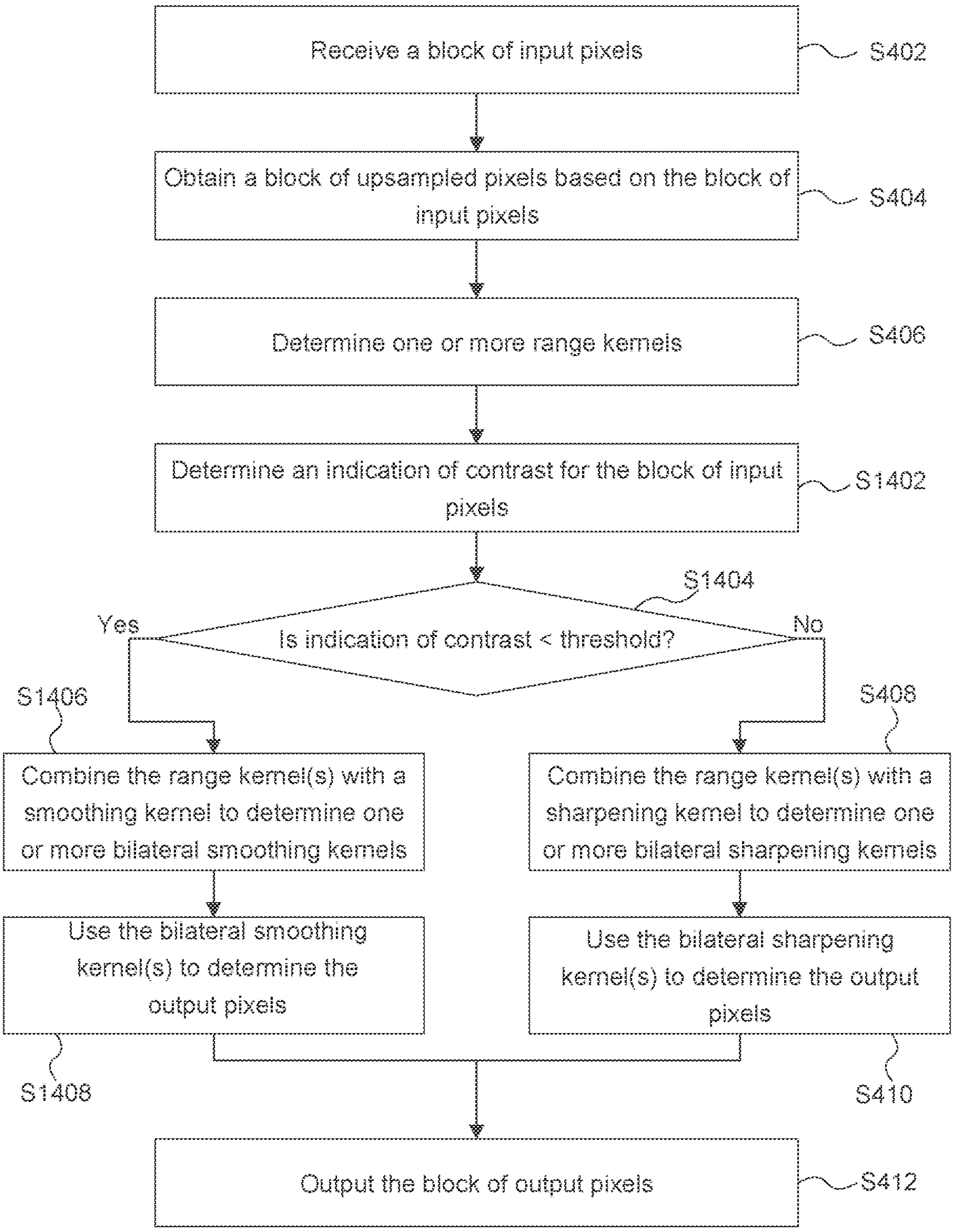
FIG. 14 is a flow chart for a method of applying adaptive sharpening, for a block of input pixels for which upsampling is performed, to determine a block of output pixels in which an indication of contrast is used to determine how to determine the block of output pixels.

FIG. 14 is a flow chart for a method of applying adaptive sharpening, for a block of input pixels for which upsampling is performed, to determine a block of output pixels (e.g. for implementing a super resolution technique) in which an indication of contrast is used to determine how to determine the block of output pixels. In particular, the method shown in FIG. 14 includes the steps (S402, S404, S406, S408, S410 and S412) shown in FIG. 4 and described above. The flow chart of FIG. 14 also includes steps S1402, S1404, S1406 and S1408 as described below.

In this method, a block of input pixels is received in step S402 and a block of upsampled pixels is obtained based on the block of input pixels in step S404. In step S406, one or more range kernels are determined. Following step S406, in step S1402 the output pixel determination logic 310 determines an indication of contrast for the block of input pixels. The indication of contrast could be determined based on the block of input pixels or the block of upsampled pixels. As mentioned above, the pixel values may be pixel values from the Y channel (i.e. the luminance channel). Any suitable indication of contrast could be determined. For example, the output pixel determination logic 310 could identify a minimum pixel value and a maximum pixel value within the block of input pixels or within the block of upsampled pixels values, and determine a difference between the identified minimum and maximum pixel values. This determined difference can be used as an indication of contrast for the block of input pixels. As another example, the output pixel determination logic 310 could determine a standard deviation or a variance of the input pixel values or of the upsampled pixel values, and this determined standard deviation or variance can be used as an indication of contrast for the block of input pixels.

In step S1404 the output pixel determination logic 310 determines whether the determined indication of contrast for the block of input pixels is below a threshold indicating that the block of input pixels is substantially flat. As an example, the indication of contrast could be scaled to lie in a range from 0 to 1 (where 0 indicates that the block of input pixels is completely flat and 1 indicates a maximum possible contrast for the block of input pixels), and in this example the threshold which indicates that a block of input pixels is substantially flat could be 0.02. If the indication of contrast for the block of input pixels is below the threshold then the block of input pixels can be considered to be flat. If sharpening is applied to image regions that are considered to be flat (e.g. plain background sky in an image), noise can be added to smooth regions of the image. Such noise can be particularly noticeable in image regions that are substantially flat, and it can be considered better to blur these regions slightly rather than introduce noise. As such, for these substantially flat image regions the output pixel determination logic may use a smoothing kernel rather than a sharpening kernel for determining the output pixels. In particular, if it is determined in step S1404 that the determined indication of contrast for the block of input pixels is below the threshold then the method passes to step S1406 (and not to step S408).

In step S1406 the output pixel determination logic 310 combines each of the one or more range kernels with a spatial Gaussian kernel to determine one or more bilateral smoothing kernels. This is similar to how a conventional bilateral filter kernel is determined.

In step S1408 (which follows step S1406) the output pixel determination logic 310 uses the one or more bilateral smoothing kernels (and not a bilateral sharpening kernel) to determine the output pixels of the block of output pixels. In this way smoothing, rather than sharpening, is applied to image regions that are considered to be flat. The method passes from step S1408 to step S412 in which the block of output pixel is output.

However, if it is determined in step S1404 that the determined indication of contrast for the block of input pixels is not below the threshold then the method passes to step S408 (and not to step S1406).

As described above, in step S408 the output pixel determination logic 310 combines each of the one or more range kernels with a sharpening kernel to determine one or more bilateral sharpening kernels.

In step S410 (which follows step S408) the output pixel determination logic 310 uses the one or more bilateral sharpening kernels (and not a bilateral smoothing kernel) to determine the output pixels of the block of output pixels. In this way sharpening, rather than smoothing, is applied to image regions that are not considered to be flat. The method passes from step S410 to step S412 in which the block of output pixel is output.

Figure 15:
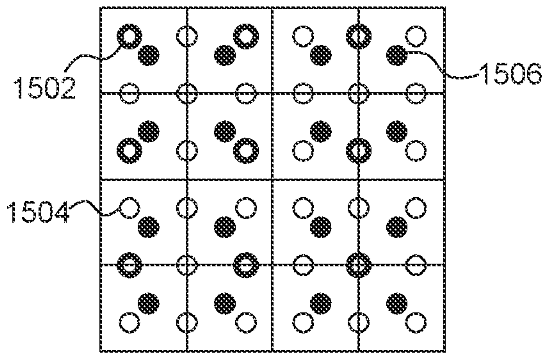
FIG. 15 illustrates a downscaling of the upsampled pixels by a factor of 1.5.

In the examples described above, the upsampling is 2× upsampling, i.e. the number of pixels is doubled in each dimension of the 2D image. In some situations a different upsampling (or "upscaling") factor may be desired, and in other examples, other upsampling factors may be implemented. For example, an upsampling factor of 1.33 (i.e. 4/3) may be desired. In order to implement 1.33× upsampling, a 2× upsampling process can be performed as described above and then a downsampling (or "downscaling") process can be performed with a downsampling ratio of 1.5. FIG. 15 illustrates a downscaling of the upsampled pixels by a factor of 1.5. Downscaling by a factor of 1.5 can be thought of as producing a 2×2 output from a 3×3 input. In FIG. 15, the original input pixels are shown as hollow circles with bold edges 1502, the 2× upsampled pixels are shown as hollow circles with non-bold edges 1504 (where it is noted that a 2× upsampled pixel is at each of the original input pixel positions), and the subsequently downscaled pixels (i.e. the 1.33× upsampled pixels) are shown as solid circles 1506. The downscaling could be performed using any suitable downscaling process, e.g. bilinear interpolation, which is a known process. In systems which implement upsampling and adaptive sharpening, the downscaling could be performed after the upsampling and adaptive sharpening, i.e. on the output pixels in the block of output pixels. Alternatively, the downscaling could be performed after the upsampling but before the adaptive sharpening, i.e. on the blocks of upsampled pixels described herein before they are input to the output pixel determination logic 310.

Figure 16:
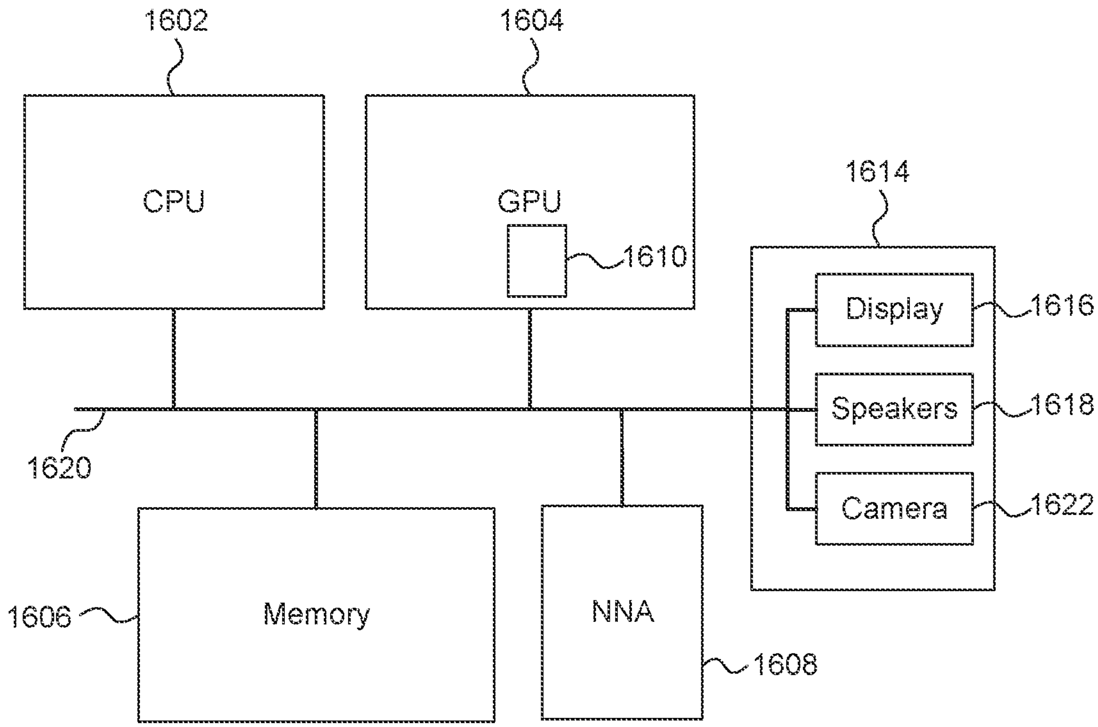
FIG. 16 shows a computer system in which a processing module is implemented.

FIG. 16 shows a computer system in which the processing modules described herein may be implemented. The computer system comprises a CPU 1602, a GPU 1604, a memory 1606, a neural network accelerator (NNA) 1608 and other devices 1614, such as a display 1616, speakers 1618 and a camera 1622. A processing block 1610 (corresponding to processing module 304) is implemented on the GPU 1604. In other examples, one or more of the depicted components may be omitted from the system, and/or the processing block 1610 may be implemented on the CPU 1602 or within the NNA 1608 or in a separate block in the computer system. The components of the computer system can communicate with each other via a communications bus 1620.

The processing module of FIG. 3 is shown as comprising a number of functional blocks. This is schematic only and is not intended to define a strict division between different logic elements of such entities. Each functional block may be provided in any suitable manner. It is to be understood that intermediate values described herein as being formed by a processing module need not be physically generated by the processing module at any point and may merely represent logical values which conveniently describe the processing performed by the processing module between its input and output.

The processing modules described herein may be embodied in hardware on an integrated circuit. The processing modules described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be or comprise any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a processing module configured to perform any of the methods described herein, or to manufacture a processing module comprising any apparatus described herein. An integrated circuit definition dataset may be, for example, an integrated circuit description.

Therefore, there may be provided a method of manufacturing, at an integrated circuit manufacturing system, a processing module as described herein. Furthermore, there may be provided an integrated circuit definition dataset that, when processed in an integrated circuit manufacturing system, causes the method of manufacturing a processing module to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS (RTM) and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a processing module will now be described with respect to FIG. 17.

Figure 17:
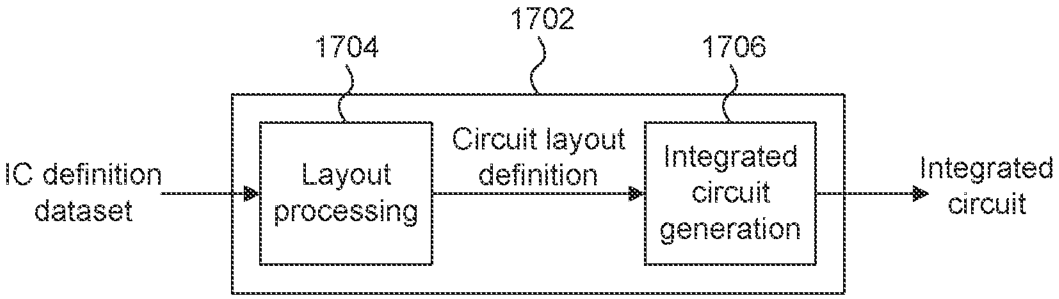
FIG. 17 shows an integrated circuit manufacturing system for generating an integrated circuit embodying a processing module.

FIG. 17 shows an example of an integrated circuit (IC) manufacturing system 1702 which is configured to manufacture a processing module as described in any of the examples herein. In particular, the IC manufacturing system 1702 comprises a layout processing system 1704 and an integrated circuit generation system 1706. The IC manufacturing system 1702 is configured to receive an IC definition dataset (e.g. defining a processing module as described in any of the examples herein), process the IC definition dataset, and generate an IC according to the IC definition dataset (e.g. which embodies a processing module as described in any of the examples herein). The processing of the IC definition dataset configures the IC manufacturing system 1702 to manufacture an integrated circuit embodying a processing module as described in any of the examples herein.

The layout processing system 1704 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1704 has determined the circuit layout it may output a circuit layout definition to the IC generation system 1706. A circuit layout definition may be, for example, a circuit layout description.

The IC generation system 1706 generates an IC according to the circuit layout definition, as is known in the art. For example, the IC generation system 1706 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1706 may be in the form of computer-readable code which the IC generation system 1706 can use to form a suitable mask for use in generating an IC.

The different processes performed by the IC manufacturing system 1702 may be implemented all in one location, e.g. by one party. Alternatively, the IC manufacturing system 1702 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a processing module without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 17 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 17, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of applying adaptive sharpening, for a block of input pixels for which upsampling is performed, to determine a block of output pixels, the method comprising:

obtaining a block of upsampled pixels based on the block of input pixels;

determining one or more range kernels based on a plurality of upsampled pixels of the block of upsampled pixels;

combining each of the one or more range kernels with a sharpening kernel to determine one or more bilateral sharpening kernels, wherein the sharpening kernel is an unsharp mask kernel, wherein the unsharp mask kernel has a plurality of unsharp mask values, wherein the unsharp mask value K(x) at a position, x, relative to the centre of the unsharp mask kernel has a value given by K(x)=I(x)+s(I(x)−G(x), where I(x) is a value at position x within an identity kernel representing the identity function, and where G(x) is a value at position x within a spatial Gaussian kernel representing a spatial Gaussian function, and s is a scale factor wherein the unsharp mask kernel, the identity kernel and the spatial Gaussian kernel are the same size and shape as each other; and using the one or more bilateral sharpening kernels to determine the output pixels of the block of output pixels.

2. The method of claim 1, wherein said using the one or more bilateral sharpening kernels to determine the output pixels of the block of output pixels comprises applying the one or more bilateral sharpening kernels after said combining each of the one or more range kernels with a sharpening kernel to determine the one or more bilateral sharpening kernels.

3. The method of claim 1, wherein the spatial Gaussian function is of the form $$G(x) = Ae^{-\frac{x^2}{2\sigma_{spatial}^2}},$$

where $\sigma_{spatial}$ is a parameter representing a standard deviation of the spatial Gaussian function, and where A is a scalar value.

4. The method of claim 1, wherein each of the one or more range kernels has a plurality of range kernel values, wherein the range kernel value R(x) at a position, x, of the range kernel is given by a range Gaussian function, wherein the range Gaussian function is of the form $$R(I(x_i) - I(x)) = Be^{-\frac{(I(x_i)-I(x))^2}{2\sigma_{range}^2}},$$

where I(x) is the value of the upsampled pixel at position x in the block of upsampled pixels, where $I(x_i)$ is the value of the upsampled pixel at a position corresponding to the centre of the range kernel, where $\sigma_{range}$ is a parameter representing the standard deviation of the range Gaussian function, and where B is a scalar value.

5. The method of claim 1, wherein each of the one or more range kernels, the sharpening kernel and each of the one or more bilateral sharpening kernels are the same size and shape as each other.

6. The method of claim 1, wherein each of the one or more range kernels is combined with the sharpening kernel by performing elementwise multiplication to determine the one or more bilateral sharpening kernels.

7. The method of claim 1, further comprising normalising each of the one or more bilateral sharpening kernels prior to said using the one or more bilateral sharpening kernels to determine the output pixels of the block of output pixels.

8. The method of claim 1, wherein said obtaining a block of upsampled pixels comprises upsampling the block of input pixels, wherein said upsampling the block of input pixels comprises performing bilinear upsampling on the block of input pixels.

9. The method of claim 1, wherein said obtaining a block of upsampled pixels comprises receiving the block of upsampled pixels.

10. The method of claim 1, wherein said determining one or more range kernels comprises determining a plurality of range kernels, and wherein said determining a plurality of range kernels comprises determining, for each of a plurality of partially overlapping sub-blocks of upsampled pixels within the block of upsampled pixels, a respective range kernel based on the upsampled pixels of that sub-block of upsampled pixels.

11. The method of claim 10, wherein said using the one or more bilateral sharpening kernels to determine the output pixels of the block of output pixels comprises determining each of the output pixels by applying, to a respective one of the plurality of partially overlapping sub-blocks of upsampled pixels, the respective bilateral sharpening kernel that was determined by combining the respective range kernel determined for that sub-block of upsampled pixels with the sharpening kernel.

12. The method of claim 10, wherein:

the block of input pixels is an m×m block of input pixels, the block of upsampled pixels is a n×n block of upsampled pixels, each of the sub-blocks of upsampled pixels is a p×p sub-block of upsampled pixels, each of the range kernels is a p×p range kernel, the sharpening kernel is a p×p sharpening kernel, each of the bilateral sharpening kernels is a p×p bilateral sharpening kernel, and the block of output pixels is a q×q block of output pixels;

wherein n>m, and wherein n=p+1 and p is odd.

13. The method of claim 1, wherein said determining one or more range kernels comprises determining a single range kernel based on upsampled pixels of the block of upsampled pixels, and wherein a single bilateral sharpening kernel is determined by combining the single range kernel with the sharpening kernel.

14. The method of claim 13, wherein said using the one or more bilateral sharpening kernels to determine the output pixels of the block of output pixels comprises:

using the single bilateral sharpening kernel to determine a plurality of bilateral sharpening subkernels by performing kernel decomposition; and applying each of the bilateral sharpening subkernels to the block of input pixels to determine respective output pixels of the block of output pixels.

15. The method of claim 14, wherein said using the single bilateral sharpening kernel to determine a plurality of bilateral sharpening subkernels by performing kernel decomposition comprises:

upsampling the single bilateral sharpening kernel; and deinterleaving the values of the upsampled bilateral sharpening kernel to determine the plurality of bilateral sharpening subkernels, wherein the method further comprises normalising the bilateral sharpening subkernels.

16. The method of claim 15, further comprising padding the upsampled bilateral sharpening kernel with one or more rows and/or one or more columns of zeros prior to deinterleaving the values of the upsampled bilateral sharpening kernel to determine the plurality of bilateral sharpening subkernels, wherein:

the block of input pixels is an m×m block of input pixels, the block of upsampled pixels is a n×n block of upsampled pixels, the single range kernel is a p×p range kernel, the sharpening kernel is a p×p sharpening kernel, the bilateral sharpening kernel is a p×p bilateral sharpening kernel, the block of output pixels is a q×q block of output pixels, the upsampled bilateral sharpening kernel is a u×u upsampled bilateral sharpening kernel, the padded upsampled bilateral sharpening kernel is a t×t padded upsampled bilateral sharpening kernel, each of the bilateral sharpening subkernels is a m×m bilateral sharpening subkernel, and the number of bilateral sharpening subkernels is v;

wherein n>m, wherein t mod v=0, and wherein p is odd.

17. The method of claim 1, wherein said determining one or more range kernels comprises determining a single range kernel based on the upsampled pixels of one sub-block of upsampled pixels from a plurality of partially overlapping sub-blocks of upsampled pixels within the block of upsampled pixels, and wherein a single bilateral sharpening kernel is determined by combining the single range kernel with the sharpening kernel, wherein said using the one or more bilateral sharpening kernels to determine the output pixels of the block of output pixels comprises determining each of the output pixels by applying the single bilateral sharpening kernel to a respective one of the plurality of partially overlapping sub-blocks of upsampled pixels.

18. The method of claim 1, further comprising outputting the block of output pixels for storage in a memory, for display or for transmission.

19. A processing module configured to apply adaptive sharpening, for a block of input pixels for which upsampling is performed, to determine a block of output pixels, the processing module comprising output pixel determination logic configured to:

receive a block of upsampled pixels based on the block of input pixels;

determine one or more range kernels based on a plurality of upsampled pixels of the block of upsampled pixels;

combine each of the one or more range kernels with a sharpening kernel to determine one or more bilateral sharpening kernels, wherein the sharpening kernel is an unsharp mask kernel, wherein the unsharp mask kernel has a plurality of unsharp mask values, wherein the unsharp mask value K(x) at a position, x, relative to the centre of the unsharp mask kernel has a value given by $K(x)=I(x)+s(I(x)-G(x))$, where I(x) is a value at position x within an identity kernel representing the identity function, and where G(x) is a value at position x within a spatial Gaussian kernel representing a spatial Gaussian function, and s is a scale factor, wherein the unsharp mask kernel, the identity kernel and the spatial Gaussian kernel are the same size and shape as each other; and use the one or more bilateral sharpening kernels to determine the output pixels of the block of output pixels.

20. A non-transitory computer readable storage medium having stored thereon an integrated circuit definition dataset that, when processed in an integrated circuit manufacturing system, configures the integrated circuit manufacturing system to manufacture a processing module which is configured to apply adaptive sharpening, for a block of input pixels for which upsampling is performed, to determine a block of output pixels, the processing module comprising output pixel determination logic configured to:

receive a block of upsampled pixels based on the block of input pixels;

determine one or more range kernels based on a plurality of upsampled pixels of the block of upsampled pixels;

combine each of the one or more range kernels with a sharpening kernel to determine one or more bilateral sharpening kernels, wherein the sharpening kernel is an unsharp mask kernel, wherein the unsharp mask kernel has a plurality of unsharp mask values, wherein the unsharp mask value K(x) at a position, x, relative to the centre of the unsharp mask kernel has a value given by $K(x)=I(x)+s(I(x)-G(x)$, where I(x) is a value at position x within an identity kernel representing the identity function, and where G(x) is a value at position x within a spatial Gaussian kernel representing a spatial Gaussian function, and s is a scale factor, wherein the unsharp mask kernel, the identity kernel and the spatial Gaussian kernel are the same size and shape as each other; and use the one or more bilateral sharpening kernels to determine the output pixels of the block of output pixels.

* * * * *